United States Patent
Randall et al.

(10) Patent No.: US 9,292,516 B2
(45) Date of Patent: Mar. 22, 2016

(54) GENERATION, ORGANIZATION AND/OR PLAYING BACK OF CONTENT BASED ON INCORPORATED PARAMETER IDENTIFIERS

(75) Inventors: Bruce W. Randall, Corte Madera, CA (US); Todd Daggert, Petaluma, CA (US); Paul R. Wenker, Petaluma, CA (US); Sergio M. Etcheverry, Campbell, CA (US)

(73) Assignee: Sonic Solutions LLC, Santa Clara, CA (US)

( * ) Notice: Subject to any disclaimer, the term of this patent is extended or adjusted under 35 U.S.C. 154(b) by 2925 days.

(21) Appl. No.: 11/060,638

(22) Filed: Feb. 16, 2005

(65) Prior Publication Data

US 2006/0184538 A1    Aug. 17, 2006

(51) Int. Cl.
*G06F 17/30* (2006.01)

(52) U.S. Cl.
CPC .... *G06F 17/30032* (2013.01); *G06F 17/30041* (2013.01)

(58) Field of Classification Search
CPC .............. G06F 17/30056; G06F 17/30032; G06F 17/30041
USPC ................ 707/7–10, 999.7–10, 609, 802
See application file for complete search history.

(56) References Cited

U.S. PATENT DOCUMENTS

| | | |
|---|---|---|
| 4,000,510 A | 12/1976 | Cheney et al. |
| 4,386,375 A | 5/1983 | Altman |
| 4,602,907 A | 7/1986 | Foster |
| 4,775,935 A | 10/1988 | Yourick |
| 4,798,543 A | 1/1989 | Spiece |
| 4,804,328 A | 2/1989 | Barrabee |
| 4,863,384 A | 9/1989 | Slade |
| 5,426,629 A | 6/1995 | Saitou et al. |
| 5,467,329 A | 11/1995 | Hashimoto |
| 5,617,502 A | 4/1997 | Ort et al. |

(Continued)

FOREIGN PATENT DOCUMENTS

| | | |
|---|---|---|
| EP | 194143 | 9/1986 |
| EP | 0852443 A2 | 7/1998 |

(Continued)

OTHER PUBLICATIONS

Kruse-ITS Limited, product; "http://www.krusenz.com"; current as of Jun. 7, 2005.

(Continued)

*Primary Examiner* — Jorge A Casanova
(74) *Attorney, Agent, or Firm* — Ropes & Gray LLP

(57) ABSTRACT

The present embodiments provide methods and systems for use in generating, organizing, and/or playing back multimedia content. Some embodiments provide methods for use in organizing source content by accessing a plurality of media content having parameter data associated with each of the media content, identifying a first organizational style, identifying a first parameter data according to the first organizational style, analyzing the parameter data of each of the plurality of media content relative to the first parameter data, organizing the plurality of media content as the parameter data for each of the plurality of media content relates to the identified first parameter data according to the first organizational style, and generating an output content incorporating the plurality of media content as organized according to the first organizational style.

27 Claims, 10 Drawing Sheets

(56) References Cited

U.S. PATENT DOCUMENTS

| | | | |
|---|---|---|---|
| 5,619,024 A | 4/1997 | Kolls | |
| 5,633,946 A | 5/1997 | Lachinski et al. | |
| 5,721,827 A | 2/1998 | Logan et al. | |
| 5,721,880 A | 2/1998 | McNeill et al. | |
| 5,805,804 A | 9/1998 | Laursen et al. | |
| 5,818,935 A | 10/1998 | Maa | |
| 5,839,905 A | 11/1998 | Redford et al. | |
| 5,861,881 A | 1/1999 | Freeman et al. | |
| 5,915,091 A | 6/1999 | Ludwig et al. | |
| 5,945,988 A | 8/1999 | Williams et al. | |
| 5,977,964 A | 11/1999 | Williams et al. | |
| 5,991,813 A | 11/1999 | Zarrow | |
| 6,023,241 A | 2/2000 | Clapper | |
| 6,128,434 A | 10/2000 | Hirayama et al. | |
| 6,154,203 A | 11/2000 | Yuen et al. | |
| 6,202,061 B1 | 3/2001 | Khosla et al. | |
| 6,263,344 B1 | 7/2001 | Wu et al. | |
| 6,330,719 B1 | 12/2001 | Zigmond et al. | |
| 6,343,314 B1 | 1/2002 | Ludwig et al. | |
| 6,374,308 B1 | 4/2002 | Kempf et al. | |
| 6,426,778 B1 | 7/2002 | Valdez, Jr. | |
| 6,452,609 B1 | 9/2002 | Katinsky et al. | |
| 6,463,459 B1 | 10/2002 | Orr et al. | |
| 6,490,580 B1 | 12/2002 | Dey et al. | |
| 6,505,160 B1* | 1/2003 | Levy et al. | 704/270 |
| 6,522,620 B1 | 2/2003 | McPherson et al. | |
| 6,560,641 B1 | 5/2003 | Powderly et al. | |
| 6,567,979 B1 | 5/2003 | deCarmo | |
| 6,583,806 B2 | 6/2003 | Ludwig et al. | |
| 6,598,052 B1 | 7/2003 | Saulpaugh et al. | |
| 6,615,166 B1 | 9/2003 | Guheen et al. | |
| 6,662,060 B1* | 12/2003 | Maliszewski et al. | 700/94 |
| 6,665,489 B2 | 12/2003 | Collart | |
| 6,665,835 B1 | 12/2003 | Gutfreund et al. | |
| 6,675,193 B1 | 1/2004 | Slavin et al. | |
| 6,691,154 B1 | 2/2004 | Zhu et al. | |
| 6,721,748 B1 | 4/2004 | Knight et al. | |
| 6,731,239 B2 | 5/2004 | Wall et al. | |
| 6,732,067 B1 | 5/2004 | Powderly | |
| 6,732,162 B1 | 5/2004 | Wood et al. | |
| 6,741,790 B1* | 5/2004 | Burgess | 386/46 |
| 6,757,866 B1 | 6/2004 | Dey et al. | |
| 6,862,611 B1 | 3/2005 | Marics et al. | |
| 6,909,708 B1 | 6/2005 | Krishnaswamy et al. | |
| 6,952,697 B1 | 10/2005 | Rothschild | |
| 6,959,339 B1 | 10/2005 | Wu et al. | |
| 6,976,229 B1 | 12/2005 | Balabanovic et al. | |
| 7,024,497 B1 | 4/2006 | Maffezoni | |
| 7,111,009 B1 | 9/2006 | Gupta et al. | |
| 7,165,071 B2* | 1/2007 | Fanning et al. | 707/10 |
| 7,254,825 B1 | 8/2007 | Sharples et al. | |
| 7,272,843 B1 | 9/2007 | Nejime et al. | |
| 7,281,199 B1 | 10/2007 | Nicol et al. | |
| 7,412,482 B2 | 8/2008 | Ludwig et al. | |
| 7,448,021 B1 | 11/2008 | Lamkin et al. | |
| 7,454,515 B2 | 11/2008 | Lamkin et al. | |
| 7,458,091 B1 | 11/2008 | Getsin et al. | |
| 7,499,938 B2 | 3/2009 | Collart | |
| 7,505,992 B2 | 3/2009 | Collart | |
| 7,577,677 B2 | 8/2009 | Collart | |
| 2001/0051037 A1 | 12/2001 | Safadi et al. | |
| 2001/0056434 A1 | 12/2001 | Kaplan et al. | |
| 2002/0007493 A1 | 1/2002 | Butler et al. | |
| 2002/0049978 A1 | 4/2002 | Rodriguez et al. | |
| 2002/0053078 A1 | 5/2002 | Holtz et al. | |
| 2002/0064149 A1 | 5/2002 | Elliott et al. | |
| 2002/0083469 A1 | 6/2002 | Jeannin et al. | |
| 2002/0103855 A1 | 8/2002 | Chatani | |
| 2002/0136406 A1 | 9/2002 | Fitzhardinge et al. | |
| 2002/0161578 A1 | 10/2002 | Saindon et al. | |
| 2002/0184637 A1 | 12/2002 | Perlman | |
| 2003/0069874 A1 | 4/2003 | Hertzog et al. | |
| 2003/0177170 A1 | 9/2003 | Glass | |
| 2003/0191697 A1* | 10/2003 | Stolski | 705/27 |
| 2004/0010510 A1 | 1/2004 | Hotti | |
| 2004/0012519 A1* | 1/2004 | Durst et al. | 342/357.07 |
| 2004/0017475 A1* | 1/2004 | Akers et al. | 348/207.1 |
| 2004/0024818 A1 | 2/2004 | Yoon et al. | |
| 2004/0114042 A1* | 6/2004 | Paolini et al. | 348/207.99 |
| 2004/0139077 A1* | 7/2004 | Banker | 707/10 |
| 2004/0215755 A1 | 10/2004 | Oneill | |
| 2004/0218894 A1* | 11/2004 | Harville et al. | 386/46 |
| 2005/0076058 A1* | 4/2005 | Schwesig et al. | 707/104.1 |
| 2005/0154682 A1 | 7/2005 | Taylor | |
| 2005/0204042 A1* | 9/2005 | Banerjee et al. | 709/226 |
| 2005/0223013 A1* | 10/2005 | Jarman | 707/10 |
| 2005/0240588 A1* | 10/2005 | Siegel et al. | 707/9 |
| 2006/0159431 A1 | 7/2006 | Ando et al. | |
| 2006/0178902 A1* | 8/2006 | Vicars et al. | 705/1 |
| 2006/0184538 A1 | 8/2006 | Randall | |
| 2007/0094583 A1 | 4/2007 | Randall | |

FOREIGN PATENT DOCUMENTS

| | | |
|---|---|---|
| JP | 10162018 | 6/1998 |
| JP | 11161663 | 6/1999 |
| JP | 2000259655 | 9/2000 |
| WO | WO-97/05616 | 2/1997 |
| WO | WO98/54896 | 12/1998 |

OTHER PUBLICATIONS

The Glogal-Tech Accelerator, "Kruse Control on the Information Highway"; "www.irl.cri.nz/glogal-tech/news/Article4.html"; Innovate Issue 32, Jun. 1999.

California Coastal Records Project; "www.californiacoastline.org"; current as of Jun. 7, 2005.

Red Hen Systems, Inc. product; "www.redhensystems.com"; Video Collection Hardware and Multimedia Mapping Software; current as of Jun. 7, 2005.

Office Action from U.S. Appl. No. 09/488,337 dated Jan. 15, 2003.
Office Action from U.S. Appl. No. 09/488,337 dated Feb. 14, 2006.
Office Action from U.S. Appl. No. 09/488,614 dated Oct. 5, 2006.
Advisory Action from U.S. Appl. No. 09/489,601 dated Feb. 8, 2005.
Office Action from U.S. Appl. No. 09/489,601 dated Jan. 30, 2004.
Office Action from U.S. Appl. No. 09/489,601 dated Apr. 13, 2007.
Office Action from U.S. Appl. No. 09/489,601 dated Apr. 27, 2006.
Office Action from U.S. Appl. No. 09/489,601 dated Jun. 2, 2005.
Office Action from U.S. Appl. No. 09/489,601 dated Jul. 9, 2004.
Office Action from U.S. Appl. No. 09/489,601 dated Oct. 20, 2004.
Office Action from U.S. Appl. No. 09/489,601 dated Nov. 15, 2005.
Advisory Action from U.S. Appl. No. 09/489,597 dated Jan. 17, 2006.
Office Action from U.S. Appl. No. 09/489,597 dated Apr. 5, 2005.
Office Action from U.S. Appl. No. 09/489,597 dated May 1, 2006.
Office Action from U.S. Appl. No. 09/489,597 dated Jul. 27, 2004.
Office Action from U.S. Appl. No. 09/489,597 dated Oct. 18, 2005.
Office Action from U.S. Appl. No. 09/489,597 dated Oct. 18, 2006.
Office Action from U.S. Appl. No. 09/489,597 dated Dec. 5, 2003.
Advisory Action U.S. Appl. No. from 09/489,596 dated Dec. 27, 2006.
Office Action from U.S. Appl. No. 09/489,596 dated Feb. 11, 2004.
Office Action from U.S. Appl. No. 09/489,596 dated Jun. 14, 2006.
Office Action from U.S. Appl. No. 09/489,596 dated Jun. 30, 2005.
Office Action from U.S. Appl. No. 09/489,596 dated Jul. 8, 2003.
Office Action from U.S. Appl. No. 09/489,596 dated Aug. 2, 2004.
Office Action from U.S. Appl. No. 09/489,596 dated Sep. 13, 2006.
Office Action from U.S. Appl. No. 09/489,596 dated Oct. 3, 2002.
Office Action from U.S. Appl. No. 09/489,596 dated Dec. 14, 2004.
Office Action from U.S. Appl. No. 09/489,596 dated Dec. 29, 2005.
Office Action from U.S. Appl. No. 09/499,247 dated Jul. 3, 2001.
Advisory Action from U.S. Appl. No. 09/898,479 dated Jan. 5, 2007.
Office Action from U.S. Appl. No. 09/898,479 dated Apr. 19, 2007.
Office Action from U.S. Appl. No. 09/898,479 dated Apr. 20, 2006.
Office Action from U.S. Appl. No. 09/898,479 dated Oct. 3, 2006.
Office Action from U.S. Appl. No. 09/898,479 dated Nov. 9, 2005.
Notice of Allowance from U.S. Appl. No. 09/935,756 dated Jun. 29, 2006.

(56) References Cited

OTHER PUBLICATIONS

Notice of Allowance from U.S. Appl. No. 09/935,756 dated Sep. 18, 2006.
Office Action from U.S. Appl. No. 09/935,756 dated Feb. 14, 2005.
Office Action from U.S. Appl. No. 09/935,756 dated Jul. 25, 2005.
Notice of Allowance from U.S. Appl. No. 10/190,307 dated Jun. 6, 2007.
Office Action from U.S. Appl. No. 10/190,307 dated Jan. 18, 2007.
Office Action from U.S. Appl. No. 10/190,307 dated Mar. 16, 2006.
Office Action from U.S. Appl. No. 10/190,307 dated Jul. 31, 2006.
Office Action from U.S. Appl. No. 10/860,351 dated Feb. 7, 2007.
Notice of Allowance from U.S. Appl. No. 10/346,726 dated Mar. 12, 2007.
Office Action from U.S. Appl. No. 10/860,350 dated Apr. 3, 2007.
Advisory Action from U.S. Appl. No. 10/880,272 dated Jun. 2, 2006.
Office Action from U.S. Appl. No. 10/880,272 dated Jan. 24, 2007.
Office Action from U.S. Appl. No. 10/880,272 dated Apr. 4, 2006.
Office Action from U.S. Appl. No. 10/880,272 dated Jul. 10, 2007.
Office Action from U.S. Appl. No. 10/880,272 dated Dec. 29, 2005.
Office Action from U.S. Appl. No. 10/957,033 dated Jul. 19, 2007.
Office Action from U.S. Appl. No. 11/154,092 dated May 14, 2007.
http://www.sonic.com/, as printed in year 2007.
http://www.interactual.com/, as printed in year 2007.
PCT/US05/45521 *International Search Report* Dated Jun. 5, 2007.
Advisory Action from U.S. Appl. No. 09/476,190 dated Jun. 17, 2002.
Interview Summary from U.S. Appl. No. 09/476,190 dated Dec. 9, 2003.
Office Action from U.S. Appl. No. 09/476,190 dated Feb. 17, 2005.
Office Action from U.S. Appl. No. 09/476,190 dated Mar. 22, 2004.
Notice of Allowance from U.S. Appl. No. 09/488,613 dated Jan. 13, 2004.
Office Action from U.S. Appl. No. 09/488,613 dated Jun. 5, 2003.
Office Action from U.S. Appl. No. 09/488,613 dated Jun. 17, 2004.
Notice of Allowance from U.S. Appl. No. 09/499,247 dated Oct. 1, 2002.
Office Action from U.S. Appl. No. 09/499,247 dated Apr. 26, 2002.
Advisory Action from U.S. Appl. No. 09/649,215 dated Nov. 19, 2003.
Interview Summary from U.S. Appl. No. 09/649,215 dated Feb. 13, 2004.
Interview Summary from U.S. Appl. No. 09/649,215 dated May 25, 2004.
Interview Summary from U.S. Appl. No. 09/649,215 dated Aug. 15, 2005.
Interview Summary from U.S. Appl. No. 09/649,215 dated Sep. 28, 2006.
Interview Summary from U.S. Appl. No. 09/488,337 dated Aug. 5, 2003.
Advisory Action from U.S. Appl. No. 09/489,600 dated Mar. 4, 2004.
Notice of Allowance from U.S. Appl. No. 09/489,600 dated May 31, 2005.
Interview Summary from U.S. Appl. No. 09/489,601 dated Dec. 29, 2004
Interview Summary from U.S. Appl. No. 09/489,597 dated Sep. 8, 2004.
Interview Summary from U.S. Appl. No. 09/489,597 dated Oct. 18, 2005.
Interview Summary from U.S. Appl. No. 09/489,597 dated Oct. 18, 2006.
Notice of Allowance from U.S. Appl. No. 09/935,756 dated Oct. 2, 2006.
Advisory Action from U.S. Appl. No. 09/489,596 dated Sep. 21, 2005.
Interview Summary from U.S. Appl. No. 09/488,614 dated Jul. 27, 2005.
Office Action from U.S. Appl. No. 10/880,272 dated Jun. 30, 2005.
Office Action from U.S. Appl. No. 09/295,856 dated Mar. 23, 2000.
Office Action from U.S. Appl. No. 09/295,856 dated Apr. 9, 2001.
Office Action from U.S. Appl. No. 09/295,856 dated Nov. 9, 2001.
Office Action from U.S. Appl. No. 09/295,856 dated Dec. 11, 2000.
Office Action from U.S. Appl. No. 09/296,202 dated Nov. 1, 2001.
Office Action from U.S. Appl. No. 09/295,964 dated Jun. 6, 2001.
Office Action from U.S. Appl. No. 09/295,964 dated Dec. 22, 2000.
Office Action from U.S. Appl. No. 09/488,143 dated May 22, 2001.
Office Action from U.S. Appl. No. 09/488,143 dated Dec. 14, 2000.
"http://www.virtualtourguide.net, "Self-Guided Tour of Yellowstone"", *Virtual Tour Guide LLC*, first printed Jul. 3, 2007, 3 pages.
Office Action from U.S. Appl. No. 09/649,215 dated Feb. 13, 2004.
Office Action from U.S. Appl. No. 09/649,215 dated Mar. 28, 2006.
Office Action from U.S. Appl. No. 09/649,215 dated Apr. 4, 2003.
Office Action from U.S. Appl. No. 09/649,215 dated Apr. 21, 2005.
Office Action from U.S. Appl. No. 09/649,215 dated Aug. 16, 2004.
Office Action from U.S. Appl. No. 09/649,215 dated Aug. 26, 2003.
Office Action from U.S. Appl. No. 09/649,215 dated Sep. 28, 2006.
Office Action from U.S. Appl. No. 09/649,215 dated Oct. 17, 2005.
Notice of Allowance from U.S. Appl. No. 09/476,190 dated Feb. 25, 2004.
Office Action from U.S. Appl. No. 09/476,190 dated Mar. 25, 2003.
Office Action from U.S. Appl. No. 09/476,190 dated Apr. 10, 2002.
Office Action from U.S. Appl. No. 09/476,190 dated Jun. 17, 2002.
Office Action from U.S. Appl. No. 09/476,190 dated Aug. 27, 2001.
Office Action from U.S. Appl. No. 09/476,190 dated Sep. 15, 2003.
Office Action from U.S. Appl. No. 09/476,190 dated Oct. 1, 2002.
Office Action from U.S. Appl. No. 09/488,345 dated Mar. 29, 2004.
Advisory Action from U.S. Appl. No. 09/488,337 dated Jul. 29, 2004.
Advisory Action from U.S. Appl. No. 09/488,337 dated Aug. 21, 2003.
Advisory Action from U.S. Appl. No. 09/488,337 dated Aug. 24, 2006.
Examiner Answer to Appeal Brief from U.S. Appl. No. 09/488,337 dated Apr. 18, 2007.
Office Action from U.S. Appl. No. 09/488,337 dated Mar. 4, 2004.
Office Action from U.S. Appl. No. 09/488,337 dated May 6, 2005.
Office Action from U.S. Appl. No. 09/488,337 dated May 29, 2003.
http://www.virtualtourguide.net, "Self-Guided Tour of Yellowstone," Virtual Tour Guide LLC, first printed Jul. 3, 2007, 3 pages.
Final Office Action for U.S. Appl. No. 11/136,627 mailed Nov. 18, 2008.
Notice of Allowance for U.S. Appl. No. 09/649,215 mailed Jun. 6, 2008.
Non Final Office Action from U.S. Appl. No. 10/877,644 mailed Apr. 2, 2008.
*Intervideo ships ships DVD player NT4*, year 1999; http://www.albusiness.com/technology/software-services-applications-computer/6652631-1.html Mar. 15, 2008.
*Intervideo receives Multi-Channel Dolby certification*, year 1999; http://findarticles.com/p/articles/mi_mOEIN/is_1999_Sept_28/ai_55879759 Mar. 15, 2008.
Non Final Office Action from U.S. Appl. No. 11/121,516 mailed Jun. 30, 2008.
Final Office Action for U.S. Appl. No. 10/860,350 mailed Nov. 28, 2008.
Non Final Office Action from U.S. Appl. No. 10/860,351 mailed Dec. 17, 2008.
Final Office Action for U.S. Appl. No. 10/957,377 mailed Dec. 23, 2008.
Notice of Allowance for U.S. Appl. No. 10/957,033 mailed Dec. 24, 2008.
Final Office Action for U.S. Appl. No. 10/877,644 mailed Dec. 23, 2008.
Final Office Action from U.S. Appl. No. 11/323,403 mailed Jan. 5, 2009.
Notice of Allowance from U.S. Appl. No. 11/278,402 mailed Dec. 30, 2008.
Non Final Office Action from U.S. Appl. No. 09/489,596 mailed Jan. 22, 2009.
Final Office Action from U.S. Appl. No. 09/488,345 mailed Jan. 22, 2009.

(56) References Cited

OTHER PUBLICATIONS

Laramedia, Tom, "Laramedia Inc., an distribution network for commercial audio", *Web Delivering of Music 2003. 2003 WEDELMUSIC. Proceedings, Third International Conference* on Sep. 15-17, 2003, pp. 3-11.
Pinkas, B., "Efficient state updates for key management", *Proceedings of the IEEE*, vol. 92, Issue 6, Jun. 2004, pp. 910-917.
Notice of Allowance for U.S. Appl. No. 11/134,794 mailed Jul. 14, 2008.
Notice of Allowance for U.S. Appl. No. 11/278,402 mailed Jul. 16, 2008.
Final Office Action for U.S. Appl. No. 11/324,091 mailed Sep. 30, 2008.
Weidong, Shi, "High efficiency counter mode security architecture via prediction and precomputation", *Computer Architecture, 2005. ISCA '05. Proceedings 32nd International Symposium* on Jun. 4-8, 2005, 14-24.
Final Office Action from U.S. Appl. No. 11/121,516 mailed Feb. 13, 2009.
Non Final Office Action from U.S. Appl. No. 11/136,620 mailed Feb. 24, 2009.
Non Final Office Action for U.S. Appl. No. 11/119,440 mailed Mar. 19, 2009.
Notice of Allowance from U.S. Appl. No. 09/898,479 dated Oct. 3, 2007.
Office Action from U.S. Appl. No. 10/860,350 dated Oct. 17, 2007.
Notice of Allowance from U.S. Appl. No. 11/154,092 dated Sep. 21, 2007.
Office Action from U.S. Appl. No. 09/489,601 dated Oct. 4, 2007.
Office Action from U.S. Appl. No. 10/123,816 dated Nov. 14, 2007.
Office Action from U.S. Appl. No. 11/278,402 dated Dec. 10, 2007.
*International Preliminary Report on Patentabiltiy*, PCT/US2005/045521 (86673pct), issued Jun. 26, 2007.
Office Action from U.S. Appl. No. 11/278,401 dated Jan. 18, 2008.
Notice of Allowance from U.S. Appl. No. 11/154,092 dated Jan. 24, 2008.
Office Action from U.S. Appl. No. 10/860,350 dated Feb. 19, 2008.
Examiner's Answer to Appeal Brief from U.S. Appl. No. 09/489,597 dated Feb. 25, 2008.
Notice of Allowance from U.S. Appl. No. 10/190,307 dated Feb. 22, 2008.
Office Action from U.S. Appl. No. 09/489,596 dated Mar. 6, 2008.
Office Action from U.S. Appl. No. 10/860,351 dated Feb. 29, 2008.
Office Action from U.S. Appl. No. 11/136,627 dated Feb. 29, 2008.
Office Action from U.S. Appl. No. 10/957,377 dated Mar. 18, 2008.
Office Action from U.S. Appl. No. 11/134,756 dated Apr. 16, 2008.
Office Action for U.S. Appl. No. 11/324,091 dated Mar. 11, 2008.
"Compact Disc", Wikipedia.org, http://en.wikipedia.org/wiki/Compact_Disc.
"Tivo FAQ", *Internet Wayback Machine* (archive.org) published Aug. 15, 2000.
"Rainbow Technologies Announces SentilExpress 2.0 for Software Purchasing and Activation Over the Internet", *Business Wire*, Nov. 17, 1998.
Chellappa, R. K. et al., "Economics of technology standards: implications for offline movie piracy in a global context", *System Sciences, 2003. Proceedings of the 36th Annual Hawaii International Conference* Jan. 6-9, 2003, pp. 10.
Curtain, Matt, "PCFriendly Enables DVD Backchannels", *Interhack*, 2002.
Esposito, Dino, "Introduction to XML", *DNJ Online*, Jul. 1999.
Int'l Searching Authority, *International Search Report and Written Opinion of the International Searching Authority* for PCTUS0601253 mailed Jul. 8, 2008.
Int'L Searching Authority, *International Search Report* for PCT/US98/07660 mailed Nov. 26, 1998.
Jasco, Peter, "Real-Time Audio Is Now Online for Real", Multimedia Medley Mar. 1996.
Mingji, Lou et al., "Tracking and mitigating piracy", *American Control Conference*, Jun. 14-16, 2006, pp. 6.
Osta, "CD-R &CD-RW Questions & Answers", *OSTA-4 Revision 2.00* Jul. 15, 1997.
Patel, Pratik, "E-Database, XML: Extensible Markup Language", *Database Programming & Design*, Jul. 1998.
U.S.P.T.O., Office Action from U.S. Appl. No. 11/119,440 mailed Jul. 1, 2008.
U.S.P.T.O., Office Action from U.S. Appl. No. 11/051,981 mailed Jul. 22, 2008.
U.S.P.T.O., Office Action from U.S. Appl. No. 11/136,621 mailed Aug. 21, 2008.
U.S.P.T.O., Notice of Allowance for U.S. Appl. No. 09/489,601 mailed Jun. 23, 2008.
U.S.P.T.O., Office Action from U.S. Appl. No. 11/323,403 dated Apr. 14, 2008.
U.S.P.T.O., Notice of Allowance for U.S. Appl. No. 10/957,033 mailed Jun. 26, 2008.
Wang, Jizhou et al., "Online Remote Controllability Verification via Internet and Dial-up Network for DVD Recorder Based on Virtual Instrument Technology", *Electronic Measurement and Instruments, 2007. ICEMI '07. 8th International Conference* Jul. 18, 2007-Aug. 16, 2007, 3-108-3-112.
BPAI Decision—Examiner Affirmed from U.S. Appl. No. 09/489,597 mailed Dec. 9, 2009.
Examiner Interview Summary from U.S. Appl. No. 11/119,440 mailed Oct. 9, 2009.
Examiner Interview Summary from U.S. Appl. No. 11/278,403 mailed Sep. 15, 2009.
Final Office Action from U.S. Appl. No. 11/106,787 mailed Apr. 20, 2009.
Non Final Office Action from U.S. Appl. No. 10/957,449 mailed Mar. 16, 2009.
Non Final Office Action from U.S. Appl. No. 11/106,787 mailed Jul. 9, 2008.
Non Final Office Action from U.S. Appl. No. 11/180,772 mailed Jun. 16, 2009.
Non Final Office Action from U.S. Appl. No. 11/278,403 mailed Jun. 12, 2009.
Non-Final Office Action from U.S. Appl. No. 11/210,618 mailed Mar. 26, 2010.
Notice of Allowance from U.S. Appl. No. 10/877,644 mailed Apr. 20, 2009.
Notice of Allowance from U.S. Appl. No. 11/278,403 mailed Dec. 2, 2009.
Notice of Allowance from U.S. Appl. No. 11/303,507 mailed Apr. 15, 2010.
Notice of Allowance from U.S. Appl. No. 11/305,594 mailed Oct. 30, 2009.
Ng, D.M.P. et al., "Trend analysis and prediction in multimedia-on-demand systems", *Communications, 2001. ICC 2001. IEEE International Conference* on vol. 4 Jun. 11-14, 2001, pp. 1292-1298.
On, G. et al., "Replication for a distributed multimedia system", *Parallel and Distributed Systems, 2001. ICPADS 2001. Proceedings. Eighth International Conference* Jun. 26-29, 2001, pp. 37-42.
Rong, L. et al., "Dynamic multimedia adaptation and updating of media streams with MPEG-21", *Consumer Communications and Networking Conference, 2004. CCNC 2004. First IEEE* Jan. 5-8, 2004, pp. 436-441.
Office Action from U.S. Appl. No. 09/488,337 dated Jun. 1, 2006.
Office Action from U.S. Appl. No. 09/488,337 dated Oct. 19, 2005.
Office Action from U.S. Appl. No. 09/488,337 dated Oct. 21, 2004.
Office Action from U.S. Appl. No. 09/488,337 dated Oct. 24, 2003.
Notice of Allowance from U.S. Appl. No. 09/489,600 dated Aug. 2, 2006.
Notice of Allowance from U.S. Appl. No. 09/489,600 dated Sep. 7, 2006.
Notice of Allowance from U.S. Appl. No. 09/489,600 dated Oct. 24, 2006.
Office Action from U.S. Appl. No. 09/489,600 dated Mar. 2, 2005.
Office Action from U.S. Appl. No. 09/489,600 dated Jun. 17, 2003.
Office Action from U.S. Appl. No. 09/489,600 dated Jul. 29, 2004.
Office Action from U.S. Appl. No. 09/489,600 dated Nov. 14, 2003.
Office Action from U.S. Appl. No. 09/489,600 dated Dec. 3, 2002.

(56) References Cited

OTHER PUBLICATIONS

Advisory Action from U.S. Appl. No. 09/488,155 dated Apr. 15, 2004.
Notice of Allowance from U.S. Appl. No. 09/488,155 dated Oct. 13, 2004.
Office Action from U.S. Appl. No. 09/488,155 dated Jan. 21, 2004.
Office Action from U.S. Appl. No. 09/488,155 dated Jul. 2, 2003.
Office Action from U.S. Appl. No. 09/488,155 dated Jul. 3, 2001.
Advisory Action from U.S. Appl. No. 09/488,614 dated May 20, 2005.
Office Action from U.S. Appl. No. 09/488,614 dated Jan. 12, 2005.
Office Action from U.S. Appl. No. 09/488,614 dated Mar. 15, 2006.
Office Action from U.S. Appl. No. 09/488,614 dated Mar. 29, 2004.

* cited by examiner

GENERATION, ORGANIZATION AND/OR PLAYING BACK OF CONTENT BASED ON INCORPORATED PARAMETER IDENTIFIERS

FIELD OF THE INVENTION

The present invention relates generally to multimedia content, and more particularly to generating, organizing and playing back of content.

BACKGROUND

There are several different types of multimedia content, such as audio, images, video, and other such multimedia content. The generation of such content is well known in the art, and typically captured through film and/or sensors that detect acoustical signals and/or light. Often the content is generated in a digital format and/or converted to a digital format.

The generation of multimedia content is relatively simple, and becoming easier and more affordable. Therefore, many individuals and companies are generating large amounts of multimedia content. The organizing of the content, however, is typically difficult and generally takes excessive amounts of time. As such, in many instances the generated content is not organized or easily viewable.

Typically, and particularly with individual users, content is recorded and is simply maintained in a storage device (e.g., electronic memory storage device, such as memory in a computer or flash memory). There is substantially no organization to the content, and is simply left in the order in which the multimedia content was recorded. Because there is little to no organization, the viewing and/or playing back of the content is restricted, and generally requires viewing content that has little or no relevance to what the user wants to view. As such, the user has to look through content that the user does not really want to look at in order to view relevant content.

SUMMARY OF THE EMBODIMENT

The present embodiments advantageously addresses the needs above as well as other needs through the provisions of the methods and systems for use in generating, organizing, and/or playing back multimedia content. Some embodiments provide methods for use in organizing source content. These methods access a plurality of media content having parameter data associated with each of the media content; identify a first organizational style; identify a first parameter data according to the first organizational style; analyze the parameter data of each of the plurality of media content relative to the first parameter data; organize the plurality of media content as the parameter data for each of the plurality of media content relates to the identified first parameter data according to the first organizational style; and generate an output content incorporating the plurality of media content as organized according to the first organizational style.

In some embodiments provide methods for use in generating organized playback content. These methods identify a playback style; retrieve a first style location parameter from the playback style; identify a first multimedia content having a first content location parameter that is geographically related to the first style location parameter; and incorporate the first multimedia content into a multimedia output according to the playback style.

Some embodiments additionally and/or alternatively provide methods for use in playing back multimedia content. Some of these methods identify a current geographic location parameter; identify a current compass parameter; access a plurality of multimedia content having location parameter data; identify a threshold distance; identify a first multimedia content having a first location parameter and an orientation parameter; and play back the first multimedia content when the current location parameter is geographically within the threshold distance of the first location parameter, and the current compass parameter matches the orientation parameter.

In some additionally embodiments provide methods for use in generating content. These methods for generating content record multimedia content onto a medium; detect latitude and longitude relative to a location where the content is being recorded while recording content; generate latitude and longitude parameter data; and record the latitude and longitude parameter data to the medium with the multimedia content.

Further embodiments provide methods for supplying a playback experience by detecting a plurality of locations of a subject over a period of time; generating a plurality of location parameters relative to each of the identified plurality of locations; recording a plurality of multimedia content of the subject corresponding to each of the identified plurality of locations; recording one of the plurality of location parameters with each of the plurality of multimedia content; organizing the plurality of recorded multimedia content based on the location parameters associated with each of the recorded multimedia content; and generating a playback experience of the organized plurality of recorded multimedia content.

Still further embodiments provide apparatuses for use in recording content. Some of these apparatus include a multimedia content detection device; a geographic location detector that detects a current location and generates location parameter data corresponding to the detected current location; a data storage medium; and a content recording device coupled with the multimedia content detection device, location detector, and storage medium, where the content recording device receives multimedia content detected by the content detection device and the location parameter data and records the multimedia content and the location parameter data to the data storage medium.

Furthermore, some present embodiments provide apparatuses for use in playing back multimedia content. These apparatuses include a data storage that stores multimedia content having content location parameter data; a geographic location detector that detects a current location and generates a playback location parameter data corresponding to the detected current location; a multimedia output; and a processor coupled with data storage and the location detector to receive the playback location parameter and search the content location parameter data of the multimedia content for a match between the playback location parameter data and the content parameter data, and to supply multimedia content identified based on the match to the output to be played back.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Figure 1:
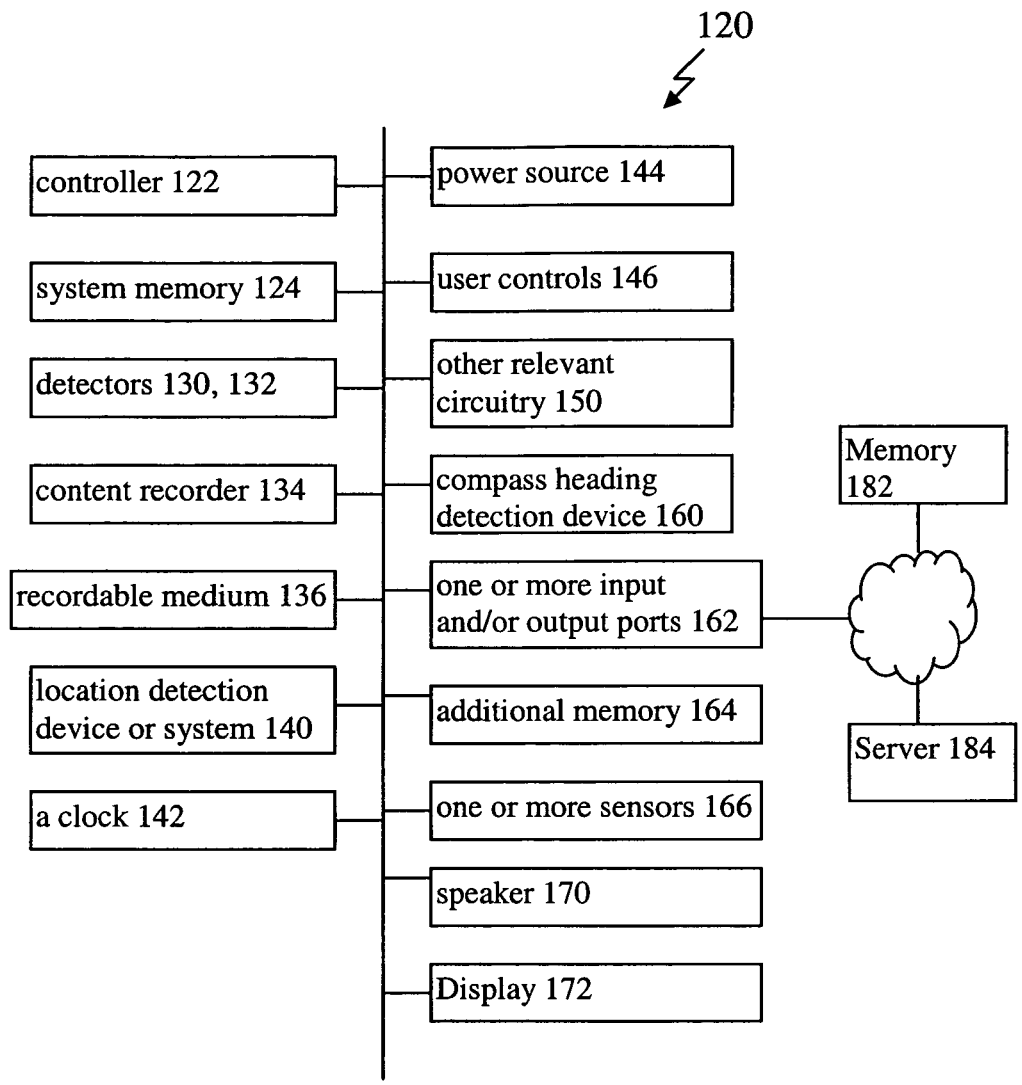
FIG. 1 depicts a simplified block diagram of a multimedia recording system or device according to some present embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide methods and systems for use in generating or recording source content or media (e.g., multimedia content), organizing the source content and playing back the source content. Further, the present embodiments generate and/or associated data, metadata, and/or parameters with the recorded content for use in organizing and playing back of the content. The metadata or parameters can include location parameter data associated defining a location where the content was recorded, time and/or date parameter data when the content was recorded, and other relevant parameter data. Utilizing the parameter data, the present embodiments simplify, and in some implementations automate the organizing of the content to create a playback experience of the content. Still further, the present embodiments allow portions of content to be selected and playback initiated based on the parameter data. By recording location and/or time parameters along with recorded multimedia content, the present embodiments allow for simplified and automated organization of the content to drastically reduce user interaction. The present embodiments further utilize the location/time parameters to determine when and how content should be played back to a viewer.

Individuals and companies record any number of different content from different locations and/or at different times. The organizing of such content is generally a manual process that is time consuming and costly. Some systems allow a user to create a playback experience, but these systems typically only take the recorded content and re-record the content to a medium, such as a digital versatile disc (DVD). These systems, however, typically do not organize the content and instead generate the DVD in generally a random order, and generally without any sense or organization. Further, if the user has differing types of content (e.g., movies, pictures, real time images, and other such content) from different locations, the generation of the DVD often results in content being disorganized, unrelated and dispersed over the DVD.

In order to organize and/or create a playback experience without the present embodiments, the person organizing the content typically has to have expert knowledge of the location where content is recorded. Additionally, the content creator typically has to review the content, determine an organization, and make a large number of detailed decisions regarding the desired presentation of the source content. For example, the content creator has to determine whether to present the source content as a virtual walkthrough, a location-based indexed library, an experience-specific library, or other such organization. Therefore, prior to the present embodiments, the organization of source content was a hand-crafted art that is achieved through great effort, time and expense.

The present embodiments streamline and/or automate the generation of a playback experience based on cooperated and/or embedded information within the source content itself, such as location-based data, time data, biometric and/or physiological data, and other such data cooperated with and/or embedded with the source content. As such, the preset embodiments provide methods and systems that allow users to create detailed and/or expert-level playback experiences, quickly change the organization (e.g., by switching between presentation styles, as described fully below) and allowing the user to easily and quickly determine the most satisfactory end experience. The playback experience is generated through an automated process that converts tagged content (e.g., location-tagged, time-tagged, biometrically-tagged, and the like) to an accessible and/or browseable data store. Further, through the application of specific styles and templates the source can automatically be manipulated or massaged into a highly enjoyable and/or expert playback experience.

As introduced above, the present embodiments utilize associated, cooperated and/or embedded parameter data to determine relevance of the content with respect to other content. This parameter data can include data regarding location, time, biometric or physiological state of a user recording the source content, and other such parameter data. In recording or generating the parameter data, the parameter data can in some embodiments be generated simultaneously with the content and recorded directly with the source content. In some alternative embodiments, the parameter data is recorded to a separate storage and associated with the source content. Still further, additional parameter data and conditions can be associated with media content later after recording has taken place. The parameter data in some embodiments is recorded metadata associated with the recorded content.

FIG. 1 depicts a simplified block diagram of a multimedia recording system or device 120 according to some embodiments. The recording system can record audio content, visual content and/or other such content, and can be substantially any relevant multimedia recording system, such as a camera, video camera and other such multimedia recording device.

The recording system 120 includes a controller 122, system memory 124, detectors 130, 132, content recorder 134, recordable medium 136, location detection device or system 140, a clock 142, power source 144, user controls 146, and other relevant circuitry 150 for operating the system and/or recording content and parameter data. In some embodiments, the recording system 120 further includes a compass heading and/or inclination detection device 160, one or more input and/or output ports 162, additional memory 164, one or more sensors 166, and audio and visual outputs such as speakers 170 and display 172.

The controller 122 provides control for the recording system 120 and coordinates the cooperation between at least some of the components of the system. The controller can be implemented through one or more processors, microprocessors, and other controllers as are known in the art. The system memory 124 stores executables, programs, and control parameters accessible by the controller 122 and other components of the system, and can include read only memory (ROM), random access memory (RAM), erasable programmable read-only memory (EPROM), flash memory, optical memory, removable memory, and other such memory and/or combinations of memory.

The one or more detectors can include audio detector 130, and image detector 132 for video recording. For example, the video detector in some implementation is a light sensitive charge-coupled device (CCD), a complementary metal-oxide semiconductor (CMOS), or other electronic sensor that records images as electronic data. The detectors 130, 132 couple with the content recording device 134 that includes or couples with the one or more recordable medium 136, such as a portable recording tape, flash memory, portable recording disk, or other such memory. The content recording device 134 directs source media content detected from the detectors 130, 132 to be recorded in the recordable medium.

The system 120 further includes the location detection device 140 that detects the current location of the system as media content is recorded to the recordable medium 136. The location detection device is shown as incorporated into the system 120. In some embodiments, however, the location detection device 140 is an independent device that couples with the recording system 120 (e.g., through an input port 162) and supplies location data to the system. Typically, the location detection device wirelessly receives the location data simultaneously while content is recorded. In some implementations, the location detection device is a global positioning satellite (GPS) device that receives signals from one or more satellites to determine an exact geographic location to within a threshold, depending on the accuracy of the GPS device. Other similar location detection devices can be utilized.

The location detection device further couples with the content recording device such that the detected geographic location data (e.g., latitude, longitude, altitude and other such location data) is recorded. Alternatively and/or additionally, the location data can be recorded in the additional memory 164 along with a media content index to cooperate or associate the recorded content with the recorded location data as further described below. In some instances, the location data is incorporated, intermixed and/or multiplexed with the media content data stream (e.g., using a bit code identifier in an MPEG 2 string, WMV string or other such formats). Alternatively, the location data is recorded on the same recordable medium as the content but in a predefined location. For example, when the recording medium is a magnetic tape, a separate track can be utilized on the tape to record the location data, and/or the parameter data can be intermixed with the content. As another example, when the recording medium is a portable disk (e.g., compact disk (CD) or DVD) a predefined portion, such as a portion near the center of the disk, can be defined to receive the location data and indexing to associate the location data with the media content.

In some embodiments, the location data is further supplied by the user, and/or acquired remotely. For example, the user can specify (e.g., using the user controls 146) the location (e.g., a country, state, province, county, city, street, address, point of interest, and/or other such location data).

The system 120 typically also includes a clock or timer 142 that tracks a time of day, and preferably a date (day and year). In some implementations, the location detection system can further wirelessly receive precise timing data. The timing data is also recorded with the content data on the recordable medium 136 and/or additional memory 164 and associated with the content.

The user controls 146 allow the user to operate the system 120 to initiate recording of the content, as well as to set operating parameters (e.g., recording quality, speed, exposure, and the like), set a mode of operation (e.g., record, playback, etc.), and other such controls. As introduced above, the user controls 146 can further allow the user to enter in additional data (e.g., location data, search terms, and other parameter data) that is recorded and associated with the recorded content. The user controls are typically buttons that are selected by the user. In some implementations, the user can further provide additional control and/or data to the recording system 120 through a remote device, such as a computer, personal digital assistant, or other devices coupled with the recording system through one of the input ports 162.

The compass heading detection device and/or inclination detection device 160 detects a compass heading during the recording of the content, and/or an inclination from a fixed reference (e.g., from horizontal). The detected compass heading and inclination data are recorded with the location data. The compass heading device can be incorporated with the location detection device 140, and/or be a separate device supplying compass heading data to the system for recording.

The input output ports 162 allow the recording system 120 to communicate via wired or wirelessly with other external devices (either directly or through a network 180) to receive and/or transmit content, data, controls, and/or other information. For example the recording system can direct the media content to external memory storage 182, receive control information from an external device (e.g., external computer or server 184), retrieve additional content to be recorded, and other such communication. In recording the content, the content can be recorded in some implementations according to a priority based on the parameter data and/or based on a template as fully described below.

One or more additional sensors 166 can be included in the system 120 to detect a user's biometric and/or physiological parameters, and/or the biometric data of another person present (e.g., the biometric parameters of subject being recorded). These biometric parameters can include a heart rate, temperature, a moisture/perspiration level of a hand, eye movement, pupil dilation, and other such biometric parameters. These parameters are similarly recorded with the media content and associated with the content. In some embodiments, the biometric parameter data is recorded as an additional "emotion track" to the recording, such as an additional track of a magnetic tape. This track can be used to index the content based on the emotions of the user recording or other person present during recording. In some implementations, the biometric parameter data can be intermixed on the magnetic tape with the content. Alternatively, the biometric parameter data can be stored on separate memory (e.g., separate tape, disc, flash memory). The recorder can index the biometric data relative to the recording. Some memory devices may further include sub or secondary memory storage. For example, a magnetic video tape can include a supplemental flash memory chip that can be included and used to identify the recording device and the tape, and can further be used to store biometric parameter data and/or other parameter data.

The sensors can be directly part of the recording device 120, separate from the recording device and/or external sensors that couple with the recording device. For example, the sensors can be located on a camcorder in the area where the user holds the camcorder. Additionally and/or alternatively, one or more external sensors can be used by one or more different people other than the person operating the recording device. For example, the sensors can be used on an audience, be used on the subject being filmed, or a person near the cameraman. The external sensor can be coupled with the recording device via wires or wirelessly (e.g., communicating via Bluetooth or other similar technology).

In recording biometric data the interest and/or importance of portions of the recorded media content can be determined. For example, those portions of a recorded video that have associated biometric data with increased heart rates suggest that these portions of the video are more important, contain more action, and/or are more emotionally influential that other portions of the content. Additionally and/or alternatively, the recording device and/or separate biometric monitoring device can include a trigger or button that is activated by the user to further identify events being recorded as important and record the user initiated trigger with the content and/or associate it with the relevant content. As further described fully below, the present embodiments can utilize the recorded biometric data in organizing and/or prioritizing content. Further, the biometric parameter data helps users find the most relevant portions of content. As such, when organizing and/or editing content, a user can quickly access those portions of the content that presumably have higher relevance to the individuals involved in recording the content. As introduced above, an index can be generated of the content based on the peaks of the biometric data that is displayed to the user allowing the user to quickly and easily access those portions of the content. Because the biometric peaks are, in some implementations, associated with the emotions of the people involved in the recording, the content that coincides with these peaks is generally the more relevant content, and thus, the biometric index assists the user in locating, organizing and/or editing the content.

Other sensors 166 can be included with the recording device such as finger print detectors and/or retina detectors. These sensors allow the recording device to further detect who is operating the recording device. The user of the recording device can further be recorded as additional parameter data to allow further organization and identification of the content. In some implementations, the identity of the operator is entered through the user controls 146. The recording device can record the user identification with the other parameter data, and further record the finger print and user identification on a local memory and retain that for later detection.

Still other sensors 166 can monitor and/or detect settings and/or conditions of the recording device. For example, a zoom sensor can be included that detects the level of zoom as content is recorded. A zoom parameter can be used based on the zoom sensor to identify whether the content is a zoomed in or out. Similarly, a lens sensor can detect a type of lens being used. Other conditions such as F-stop, speed, and other similar conditions can be sensed and/or recorded as additional parameter data. Alternatively and/or additionally, the user can enter this parameter data, such as through the user controls 146 and/or the recording device can prompt the user to enter data.

Figure 2:
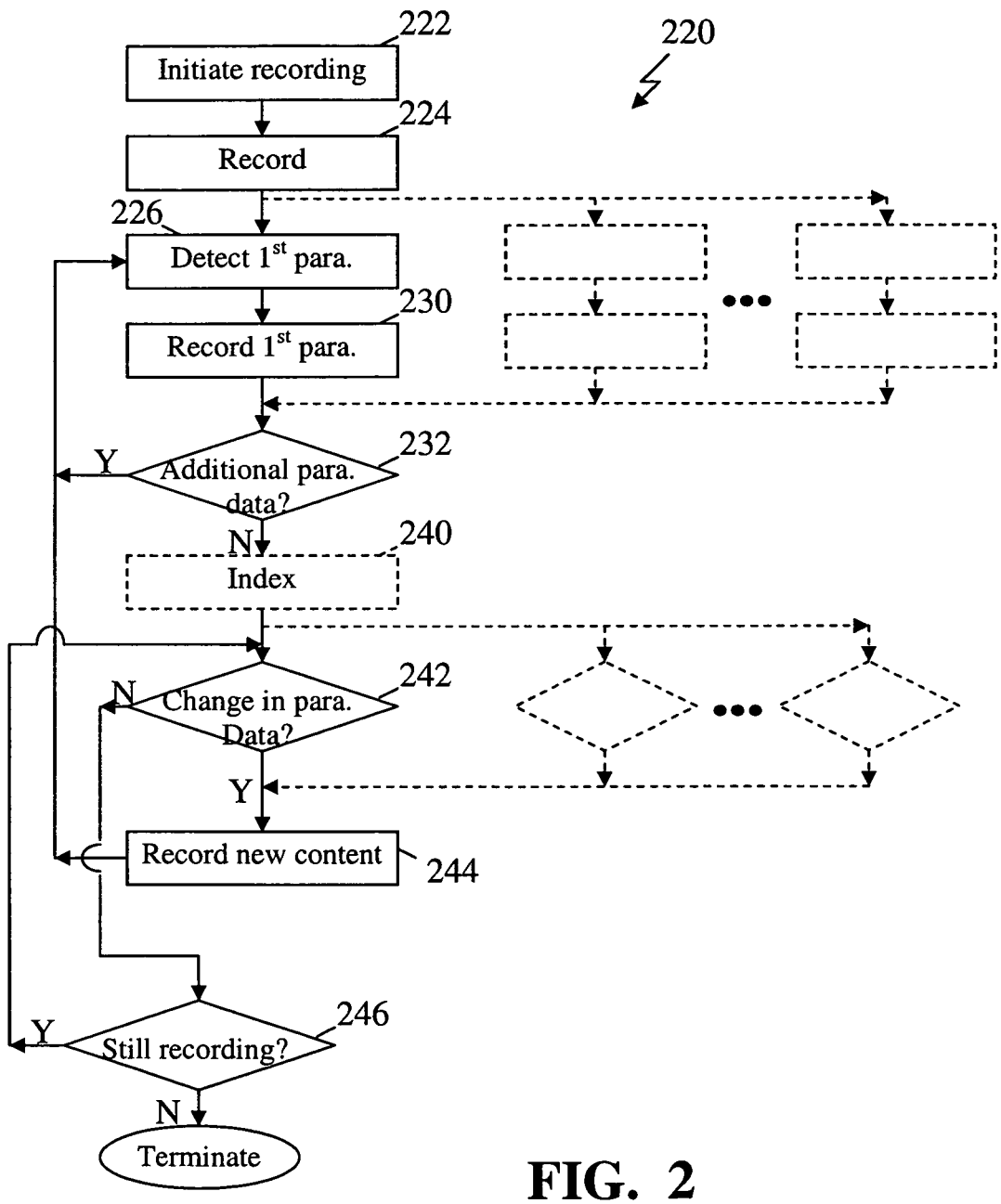
FIG. 2 depicts a simplified flow diagram of a process for use in generating content.

FIG. 2 depicts a simplified flow diagram of a process 220 for use in generating content. In some implementations, the process is implemented through the recording device 120 or other similar devices configured to record content and parameter data. In step 222, the process initiates recording of the multimedia content. For example, a user can activate the shutter of a digital camera, activate the recording of a camcorder, a system can detect an automated activation signal that initiates the recording of content, the digital scanning of a photograph or other image, and other such initiations of content. In step 224, the content is recorded to a medium, such as a tape, disc, flash memory or other such memory.

In step 226, a first parameter data is detected and/or measured for the location where the content is being recorded. For example, the first parameter data can be detecting a location parameter (e.g., latitude and/or longitude). In step 230, the first parameter data is record on the medium. Typically, step 226 is initiated simultaneously with step 224. Further, step 230 can also occur simultaneously with step 224, or alternatively can be delayed. The recording of the parameter data in step 230 typically includes recording the parameter data according to a predefined format. For example, in some implementations, step 230 includes the multiplexing of the parameter data with the content data, while in other implementations the parameter data is recorded in a predefined location of the medium (e.g., a separate track, a certain portion of a disc, as a header or tail to the content and other such formatting). In some embodiments, the parameter data can be incorporated as a header such as in an Exchangeable Image File Format (EXIF), such as the inclusion of an image file directory (IFD). Further, the recording of parameter data in step 230 can further include recording an association of the parameter data to the multimedia content, such as an indexing of the content relative to the parameter data, particularly when the parameter data is not recorded directly with the content data (e.g., intermixed, a header, a tail, or other such positioning). Additionally, the detecting and recording of parameter data can include user entered parameter data, such as user entered location information, search term parameter data and other data. For example, a country name could be selected from a standard list stored in the recording device 120, and/or a city/area name could be taken from a user-defined list previously entered and/or uploaded by the user.

In step 232, the process determines whether there is additional parameter data to be recorded. When there is additional parameter data to be recorded, steps 226 and 230 are repeated to detect, and record further parameter data. The additional parameter data can include any number of relevant parameters, such as compass heading parameter data, inclination from horizontal parameter data, time and/or date parameter data, specific location information parameter data (e.g., city, state, National Park, and the like, if known and/or can be determined), biometric parameter data, search term parameter data, user entered data, and other such parameter data. The steps 226 and 230 can be repeated for any number of parameters to be detected and/or identified. In some embodiments, the steps 226, 230 and/or 232 for multiple parameters are performed in parallel (as shown in dashed lines of FIG. 2) and are not dependent on the detection and recording of other parameters. Further as indicated above, step 230 can include the multiplexing of the detected parameter data with the content data. In some implementations, some of the parameter data can be intermixed with the content, while other parameter data is recorded in predefined locations.

Still referring to FIG. 2, in some embodiments, the process 220 further includes the optional step 240, where an indexing of the content and parameter data is generated that lists each of the recorded multimedia content according to one of the parameter data as each parameter data for each content relates to other parameter data of the other content. In step 242, the process determines whether a change in the parameter data has occurred that exceeds a threshold change. For example, the process determines in step 242 whether the location parameter data has changes by more than a fixed amount.

When a change that exceeds the threshold has been detected in step 242, step 244 is entered where subsequent content recorded is identified as a new multimedia content. The process then returns to step 226 to identify the parameter data for the new content. Again, it is noted that the steps 242 and 244 can be repeated and/or operated in parallel for any number of parameters as appropriate. When a change has not been detected in step 242, step 246 is entered where the process determines whether content is still being recorded. If content is still being recorded, the process returns to step 242. Alternatively, when content is no longer being recorded the process terminates.

The present embodiments also allow parameter data to be generated independent of the source content and later added, cooperated and/or associated with the content. For example, media content can be generated that is an advertisement (e.g., advertisement for a restaurant, a hotel or other such advertisement). As another example, a user may not have a recording device that incorporates or allows for parameter data to be incorporated during the recording of the content. The user can later access parameter data, for example by accessing location data from an Internet site (e.g., a Yosemite National Park Web Site that includes location information), a remote GPS device, or other location data, and incorporate or associate the later retrieved parameter data into and/or with the content.

In some implementations, the parameter data is incorporated with the content at one or more predefined locations relative to the content. For example, a header can be appended to the beginning of a portion of digital data defining the source content. The header can include parameter data according to one or more defined and expected formats. For example, a first number of bits define whether parameter data exists, a second number of bits define a longitude, a third number of bits define a latitude, a fourth number of bits define a country, a fifth number of bits define a state or province, a sixth number of bits define a city, a seventh number of bits define a street, an eighth number of bits define an specific address, a ninth number of bits define a zip code, a tenth number of bits define a specific location (such as Yosemite National Park, Disneyland, and other such locations, where locations are predefined with bit codes), an eleventh number of bits define a type of location (e.g., a national park, museum, amusement park, historic cite, a certain hotel, a type of restaurant, and other such types), a twelfth number of bits define a date or range(s) of dates, a thirteenth number of bits define a time or time period(s), a fourteenth number of bits define an inclination, fifteenth number of bits define a heart rate, sixteenth number of bits define hand moisture, seventeenth number of bits define associated content, eighteenth number of bits define one or more search terms, and other numbers of bits define other parameter data. This is simply one example of a format for parameter data. It will be apparent to those skilled in the art that these bit groupings can be rearranged, altered and/or used to define other parameters without departing from the novel aspects of the present embodiments.

Additionally and/or alternatively, parameter data may also be inserted into the middle of the content at natural breaks or defined breaks in the data stream. For example, parameter data may be inserted in between video frames or between compressed packets of streamed data. In some defined, standardized data formats, the parameter data may be stored in areas reserved for user-specified data. An example of this would be "private" streams that are part of a Moving Pictures Experts Group (MPEG) stream specification. Parameter data may also be assembled into lists of data with each element in the list containing the type of data (e.g., time or latitude) and the associated data value. The data elements may be in arbitrary order and each list may contain all relevant data or only those data that have changed since the last time the data was recorded.

Other parameter data can include a level of security and/or sensitivity. For example, a user may be more willing to globally distribute a photograph of scenery while less likely to globally distribute photographs of people, and instead limit the distribution of people. Therefore, a sensitivity parameter can further be included. This sensitivity parameter could be added by the user, the recording device could prompt or ask the user to enter the level, and other such methods.

Additional parameter data can include a source of content. For example, the original creator of the content can be recorded. Thus, as content is distributed, the source of the content can be determined. Similarly, a history parameter can be included. For example, the original creator can be recorded, and the identity of other individuals who received the content and forwarded the content can also be provided to maintain a trail or track of the source. The history can further identify whether the content has been edited and/or altered. Still further, the authoring program used in editing and/or organizing content can also be recorded as history parameter data and/or independent parameter data. Other history parameter data can also be included.

Parameter data can also simply be duplicated from other source content that is similar or related to the content of interest. This duplicated parameter data can further be altered and/or adjusted. Additionally and/or alternatively, source content can simply be associated with other content that already includes and/or already is associated with parameter data. Similarly, the source content can simply be specifically disassociated with one or more other content.

Figure 3:
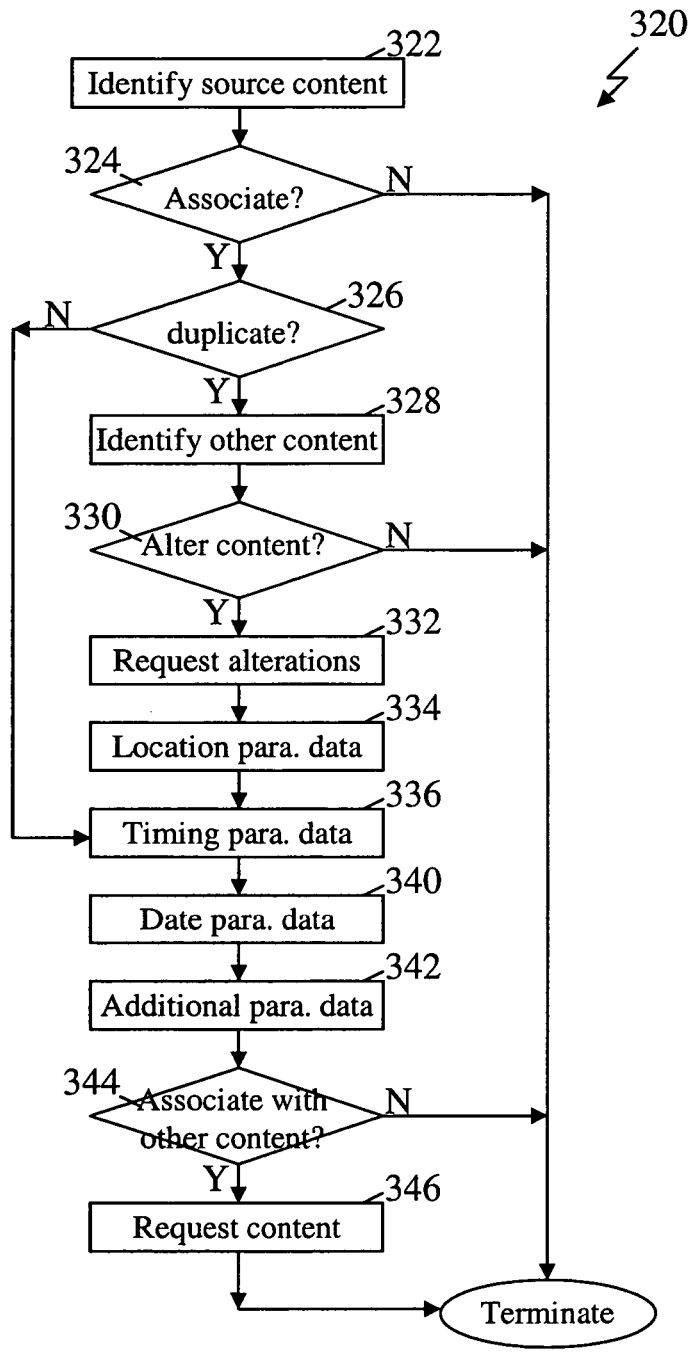
FIG. 3 depicts a simplified flow diagram of a process for incorporating and/or associating parameter data with existing content.

FIG. 3 depicts a simplified flow diagram of a process 320 for incorporating and/or associating parameter data with existing content. In step 322, source content is identified that does not include parameter data or only includes a limited amount of parameter data. In step 324, the process determines whether parameter data is to be incorporated or associated with the content. The determination can be made by asking a user whether they want to include parameter data. When it is determined that parameter data is not to be included, the process terminates. Alternatively, when parameter date is to be included, the process 320 enters step 326, where the process determines whether parameter data is to be duplicated from other content. When parameter data is to be duplicated, the process enters step 328 to request the identification of the other content from which parameter data is to be duplicated. The process then determines in step 330 if the duplicated content is to be altered. When the duplicated content is not to be altered, the process terminates. When the duplicated content is to be altered, step 332 is entered where alterations are requested and incorporated.

When parameter data is not to be duplicated in step 326, the process enters step 334 and requests location parameter data. The location parameter data can include a single longitude/ latitude pair, a single location, multiple longitude/latitude pairs and/or locations, and other location information. For example, if the content is an advertisement for a restaurant with multiple locations, the location parameter can include multiple locations and/or regions within a predefined distance of each restaurant location. Location parameter data, however, does not need to be added, and step 334 can be skipped.

In step 336, the process requests timing parameter data. Again, the timing data can be a single time, multiple times, ranges of times. For example, the content may be an advertisement for breakfast at a specific restaurant and thus be limited to times between 3:00 AM and 11:00 AM. In step 340, the process requests date parameter data, which again can be one or more specific dates or ranges of dates (e.g., advertising is seasonal, such as ski rental equipment in winter). In step 342, the process requests additional parameter data.

In step 344, the process determines whether the subject content is to be associated with other content. For example, the subject content may be a place of interest for individuals that have already been to a predefined location (e.g., content associated with the New York Metropolitan Museum of Art may be associated with content for one or more of the Smithsonian Museums). When content is to be associated, step 346 is entered where the process requests the associated content be identified. The process then terminates. Other steps can be included to further cooperate parameter data (compass parameter data, inclination parameter data, and the like). Further, steps for entering parameter data can be skipped allowing only the desired parameter data to be cooperated.

Similarly, some embodiments allow the inclusion of search term parameter data that is entered by a user, extracted, and/or retrieved from a secondary source. The search term parameter data can include the name of a national park, the name of a city, the name of a monument, the name of an amusement park, an address, a person's name, and other such terms. By incorporating search term parameter data the content can more easily be searched by a user to identify content. Typically, a user is not going to know a latitude. The user, however, will more likely know a name of a city or the name of the national park. Often, these search terms are maintained as common language search term (e.g., a certain place, a person's name, and other similar common language terms used in common speech). Thus, the search term parameter data allows the content to be more readily accessed by the user and/or organized through an automated process by associating content with the same or similar search terms.

In some instances, the search terms are generated by the recording system 120. For example, the system can wirelessly receive information, determine the terms based on location parameter data, access databases and search for location data and extract search term parameters from the database (e.g., access a user's personal address book or other data source, and identify a location, such as "Grandma's House", based on the current location parameter data), and other similar methods. The system can further generate common language search terms based on other parameter data, such as using the date to incorporate a time of year search term (e.g., "summer"). Similarly, the search terms can be user generated. For example, following the capture of content the recording system 120 can allow the user to enter and/or prompt the user to enter search term parameter data (e.g., the user can enter names of individuals in a photo, which in some instances the recording device may already have and the user can simply select the name(s) from a list). Still further, the present embodiments can use search terms of previously recorded content and generate or associate currently recorded content with that of similar search terms.

In recording common language parameter data, the recording device may request the user to enter common language parameter data. For example, one or more questions can be asked of the user to create the common language parameters. The user can alternatively initiate the entry, such as recording parameter data such as "Jane's Birthday" following the recording of the content.

The present embodiments utilize the media content as well as the parameter data (e.g., location data, compass heading data, timing data, sensor data, and/or other such parameter data) to coordinate and/or organize the content into a playback presentation or experience. Substantially any level of embedded parameter data can be utilized. For example, some content includes and/or is further associate with the GPS-information (longitude, latitude, altitude) as well as the compass headings and inclination from horizon data. The system uses the parameter data at least in part to distinguish portions of content as well as associate or disassociate content relative to other content. For example, a user may use the same recordable medium 136 to record content from a vacation at multiple different locations, as well as use the same recordable medium to record content for an event at yet a separate location (e.g., birthday party). In utilizing the location and other parameter data, the present embodiments distinguish content based on the similarities and/or differences between the parameter data. The parameter data is used to define and/or identify separate portions of the content. Once the portions of the content are individualized, the present embodiments further use the parameter data (e.g., location data) to organize the content and generate an output presentation of organized content.

Video and multimedia content editing is time consuming and difficult to do because the editor typically has to search through an entire recording and/or multiple recordings categorizing the content and looking for related, unrelated and important content and scenes. Prior to the present embodiments there was generally no easy, automated way for the video editing software to show the most relevant scenes of the video captured. The use of parameter data provided through the present embodiments simplifies the organization of content and makes video editing faster and easier, and in some implementations automated.

The media content to be organized can be retrieved from a local and/or portable recordable medium 136 and/or downloaded to an alternative storage, which in some instances can contain additional media content. Various parameter data of the collection of media content (e.g., a content library) is then compared against one another to automatically organize the content, and further in some implementations to automatically generate a playback experience. The present embodiments can also employ an organization structure or template that incorporates or organizes the content according to the parameter data, as well as providing navigational controls for the playback experience.

In organizing the content, one or more of the parameters are used to distinguish and associate content. For example, location parameter data can be used to related content. The relative location analysis can be applied with surveys of a particular location, such as to create a virtual walkthrough, as a user might prefer to use for vacation content; when documenting a real-world location, such as a new home for sale; and other such content. Multimedia, such as photos, video and other media is navigationally linked either generically or through a template based on the source acquisition location. The generated output can then be automatically presented for playback as a "walkthrough" that recreates a visit to a national park or a tour of a new home, allowing the user to virtually walk down the forest pathways or move through a doorway from the kitchen to the dining room. This type of virtual walkthrough has been seen in electronic games, but has always been either completely fantastic or created by hand in costly, time-consuming fashion from disparate sources.

Proximate location analysis can be used to identify content with location data within a prescribed tolerance, and can equate such content with one another, quickly enabling the grouping together of media acquired from the same party, same beach, same city, county or state, and the like. This organizational template can also be used to simply provide an index of media by GPS coordinate, compass orientation and/or camera attitude. The grouping of source media content by their proximate location can further allow users to select an over-arching presentation style desired for their playback experience. This can require even less positional information than the virtual walkthrough, for example, simple GPS coordinates can be sufficient. Additional positional information provides enhanced sorting, allowing media to be further cataloged by orientation and attitude.

The analysis of the parameter data, such as the location parameter analysis, allows for the automated sorting of source media, through the augmentation of known locations, to known real-world locations (e.g., an amusement park, a national park, a museum, and other such known locations). The known locations can include precise location information (e.g., with an amusement part, a known ride or attraction), to further organize the media content relative to the locations geographic layout. This augmentation further allows a user to generate playback experiences using geographically-specific styles that work in conjunction with acquired content specific to a known location to create enhanced automatic playback experiences. For example, a "Disneyland Style" could be provided that includes absolute location data of park attractions and by comparing the user's acquired source content can automatically associate the user content with the locations of the known real-world elements. This theme can then be extended throughout the user's source content or a defined portion of the content to create a specific playback experience, be it a theme park vacation, a visit to a national monument, a museum tour, a virtual tour of real estate, or other such experiences.

These and other styles, templates and techniques can be further combined in substantially any permutation to the degree desired by the application, filtered and presented via specific styles provided by the present embodiments. For example, an overall style can be utilized with one or more sub-styles further organizing content.

Styles further automate the navigation, look and feel of a playback experience. The styles can provide many features, functionality, and control, as well as additional content, music, backgrounds and other such features. Some styles locate playback navigational controls (e.g., displayed and selectable "buttons" for fast forward, rewind, and the like), define a number of pictures or screens to be displayed, define what and how background images are displayed, generate lists and/or indexing, define chapters, and other details of the navigational experience. Typically, each style is distinct in generating the output playback experience. Some styles are simple, organizational styles that provide a simple indexed list with minimal seams between content. Other styles are more complex and provide greater navigational control and further cooperate content. Still other styles fully organize and cooperate content, and dictate playback, such as providing a virtual walk through of a national park based on a timeline.

The styles utilize the parameter data to organize the content. The priority of the content depends on the style being used. Some styles organize content based on location parameters over time parameters, while others use timing data as a higher priority than location. Still further, the organization of content can be further evaluated based on sub-sets of a parameter, for example with location parameters, some styles organize based on content recorded within a mile. Similarly, with time parameter, content can be further organized by content recorded within the same day.

Some implementations additionally allow a user to alter, create and/or define a style. Predefined rules are provided that the user can select from based on the parameter data to generate the desired style. Some rules can further associate additional or external content. The style creation in some embodiments further tracks a user's preferences to anticipate rule selection in creating the style (e.g., recognizes a trend to utilize a yellow background with content recorded during summer). Further, a user's age or a user profile can be used to limit the number and/or types of rules and/or styles available.

The present embodiments can further utilize biometric parameter data in prioritizing and/or organizing content. Home video editing is generally time consuming and difficult to do because the editor has to search through the entire recording looking for important scenes. The present embodiments, however, utilize the biometric data when available, at least in part to identify more relevant and/or important scenes or portions of the recorded content to simplify video editing. Indexation of the content based on the emotion track allows a user to quickly locate those portions of content that potentially have greater relevance and/or importance allowing faster and easier video editing. Similarly, the variations of audio levels of content can also optionally be used in identifying points of interest. For example, audio levels at a game, such as a soccer or football game can indicate those portions of the content that have more interest.

Figure 4:
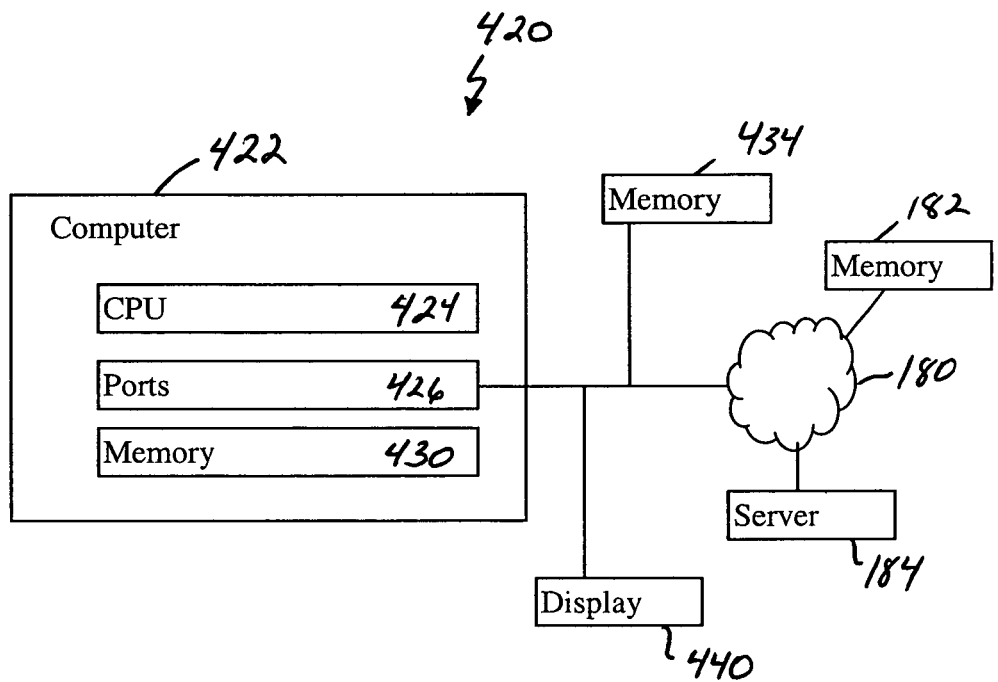
FIG. 4 depicts a simplified block diagram of a system according to some embodiments that organizes media content based on parameter data and/or incorporates the media content according to templates and styles.

FIG. 4 depicts a simplified block diagram of a system 420 according to some embodiments that organizes media content based on parameter data and/or incorporates the media content according to templates and styles. The system includes a computer or other processing device 422 that includes a central processing unit 424 (e.g., a microprocessor), input and output ports 426, and memory 430. The ports 426 can be used to couple with recording system 120, parameter measurement devices (e.g., separate GPS devices), user input devices, and other such devices. The computer 422 can further couple with external memory 434, with a network 180 to further couple with remote memory 182 and/or other devices 184, such as servers, computers, media recording devices and/or memory, and other such devices. The computer 422 can be incorporated into the recording device 120. Alternatively, the computer can receive a portable recording medium (e.g., DVD) and/or couple with a media recording system, such as the system 120, to receive and/or retrieve recorded media content and/or parameter data. The media content is stored in local memory 430, external memory 434 and/or remote memory 182. These memories can include a database of media content that is accessible by the computer. In some embodiments, the system 420 further includes a display or monitor 440 upon which multimedia content, user interfaces for implementing the organization of content and other such information can be displayed.

Figure 5:
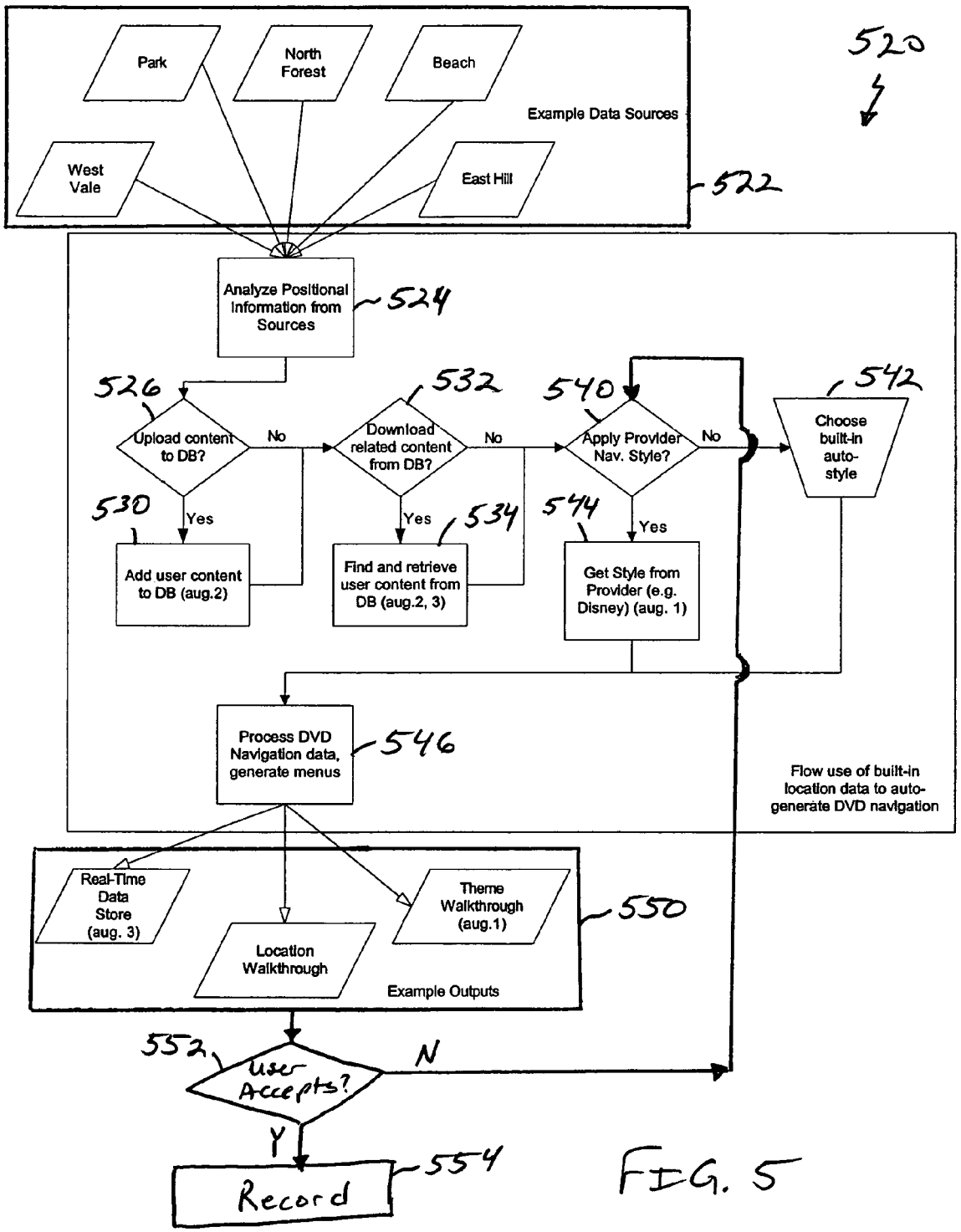
FIG. 5 depicts a simplified flow diagram of a process for use in organizing media content and/or generating a playback experience according to some embodiments.

FIG. 5 depicts a simplified flow diagram of a process 520 for use in organizing media content and/or generating a playback experience according to some embodiments. A plurality of media content is initially retrieved and/or received in step 522. The media content can be, for example, video and/or pictures taken at a plurality of different locations (e.g., content recorded at a ski resort, content recorded at an amusement park, content recorded at a national park, content recorded at a beach, content recorded at a monument, and other such content). Each content further includes and/or is associated with distinct geographic, location, time, biometric, and/or other parameter data. In step 524, each of the media content is parsed and analyzed based on parameter data, such as location, time, and other parameter data. In some implementations, the parameter data is incorporated with the media content, while in other instances, the parameter data is stored separately and associated with the media content.

In parsing the content, an analysis can further be performed to cross-index incoming data for a variety of organizational sources and/or matrices. Sub-stream portions of incoming sources can further be identify and/or categorize based on unique parameter data. The parsing of sub-stream portions can be important because the location-based information may vary during the run of one or more given content or assets. This allows a mapping of relevance per time-based portion of the incoming stream that can then later be compared, for example, based on proximity, locations relative to other sources and the like. In some implementations, the parsing of step 524 is performed to allow for rapid sorting of the sources when the user chooses to display the same set of sources according to different criteria and to allow for mechanisms that break longer sources into smaller ones based on their parameter data.

In step 526, it is determined whether the source content is to be uploaded to a general or shared memory or database (e.g., external memory 434 and/or remote memory 182). If the content is to be uploaded, step 530 is entered where the content is recorded to alternate memory. In step 532, the process determines whether additional media content is to be retrieved from a memory, such as local memory 430, external memory 434 and/or remote memory 182. In this step, the processor 424 can receive instructions from a user and/or request instructions from a user to determine whether additional content is to be retrieved. When additional content is to be retrieved, step 534 is entered where additional content is retrieved.

In step 540, the process determines whether a predefined style or organization has been defined or selected. When a style has not been selected, the system employs a default style in step 542. Alternatively, in step 544, the process 520 retrieves the desired style. In some instances, the system accesses the remote memory 182 and/or a remote server 184 to retrieve a style (e.g., a server operated by an amusement park that supplies a style specific to the amusement park). A style provider, such as an amusement park, national park, national monument, museum, and other such style providers can allow access to and/or sell the style (e.g., directly purchased as a DVD while the user is at the location and/or downloaded from a remote memory). The style can include additional content that can augment the generated playback experience, such as providing additional stock footage (e.g., history about the park), narratives, music, special effects, navigational controls and other such features and functions.

In step 546, the style is utilized to organize the content based on the parameter data (e.g., location data, time data, compass data, and the like) and/or to include additional content associated or supplied with the style to generate a playback experience. Further, control features, navigational features, title and chapter identifiers, menus, sub-menus, indexing, and other such controls and organization can be incorporated into the playback experience in step 546 based on the, content, parameter data, style and/or input entered by a user to organize the content and include navigational control to allow a user to control the playback (e.g., DVD playback controls, menus, chapter identifiers, and other such navigational controls). The user can further adjust content, add additional content, remove content, and make further changes in step 546. As one example, the plurality of content can be organized in step 546 based on the location data. The style can limit the inclusion of content to only content having location data that is within a define location, and/or organize the content according to predefined location information (e.g., the style has defined location information for regions of a national park, and utilizes the content having location data that falls within those specified regions). Similarly, content can be cooperated or associated into a sub-menu based on a specific location within a larger location (e.g., content from a portion of an amusement park can be organized according to a sub-menu of content within a menu of the amusement park). The identified content can be further organize and/or prioritized based on other parameter data, such as, biometric parameter data, time/date parameter data, and other parameter data can be used in prioritizing and/or organizing the content. In part, styles provide a template for organizing the content, and the use of the parameter data embedded or associated with the content helps to automate the generation of a playback experience based on the style organization.

In step 550, a playback experience of the media content is outputted for review by the user. In step 552 the process determines whether the outputted playback experience is accepted by the user, typically awaiting an input from a user. If the user accepts the playback experience, the process records the playback experience in step 554 and terminates. Alternatively, the process returns to step 540 to utilize another style in organizing the content.

As introduced above, some embodiments generate one or more indexes of the media content based on an organization and/or based on parameter data. In some implementations, for example, biometric parameter data is used to generate an index identifying the more relevant and/or important content (e.g., recorded scenes). These indexes allow users to more readily identify those areas of video that are potentially more important. The biometric parameter data can be indexed or rated based on a threshold, which can be defined for example by a highest biometric level (e.g., highest heart rate) with the content being indexed based on a percentage or comparison relative to the highest level.

Once indexed, the content can be presented to the user as an indexed list. Alternatively, a time line of the content can be displayed and those areas with higher biometric parameter data can be highlighted or identified (e.g., different colors can be used to distinguish areas of varying heart rate). User can select a level and have only those portions of the video having biometric parameter greater than the selected level played back to allow the user to identify those scenes to be used, kept, and/or organized. Further, based on the highlighted portions, the user can determine which portions are to be excluded from the playback experience.

Because the media content is organized and/or the experience is generated quickly and in an automated fashion where no or only limited user interaction is needed, the user can quickly select alternate styles to alter the playback experience to achieve an output playback experience that meets the users desired results. Additionally and/or alternatively, step 546 can be configured to allow a user to adjust and/or manipulate the playback experience. For example, the user can manually incorporate content into the experience, can manually alter the content organization and other such manipulations. Thus, the present embodiments streamline and automate the generation of content playback experiences such that a user can create expert-level experiences and quickly change between presentation styles until the user determines the most satisfactory end experience. Similarly, step 546 can allow the user to define a sub-organization style and/or template. For example, while processing and organizing the content in step 546, a sub-process can be initiated to repeat the process 520 to allow a sub-set of the content to be organized in a different or alternative style within an overall main style. For example, a vacation style can be utilized that creates a playback experience based generally on time and location. Within the vacation style, a national park style obtained from the national park can be used to further organize the content of the vacation relative to the national park according to the national park style. Further, in step 546 users can associate and/or incorporate a present playback experience with other previously generated playback experiences.

The styles provide organization to content, can provide additional content that can be cooperated and/or incorporated with the media content, and further can provide navigation for the resulting outputted playback experience. The style can be generated by a user, can be based solely on location parameter data, can define a set playback of content, can cooperate content such that playback is controlled by a user according to the cooperation defined by the style, and/or other such organizational, navigational and/or control features.

As one example, a style can extract location parameter data from a plurality of content that are defined as being related based on the location parameter data (e.g., all content is taken from a single home, a single amusement park, or other such relationships). The style can cause a perimeter, layout or floor plan of an area to be defined (e.g., a floor plan of a house or layout an amusement park) based on all of the location parameter data associated with the identified location. Additionally and/or alternatively, the style can already include a layout, for example when the style is supplied by an amusement park, national park, museum or other such entity.

Figure 6:
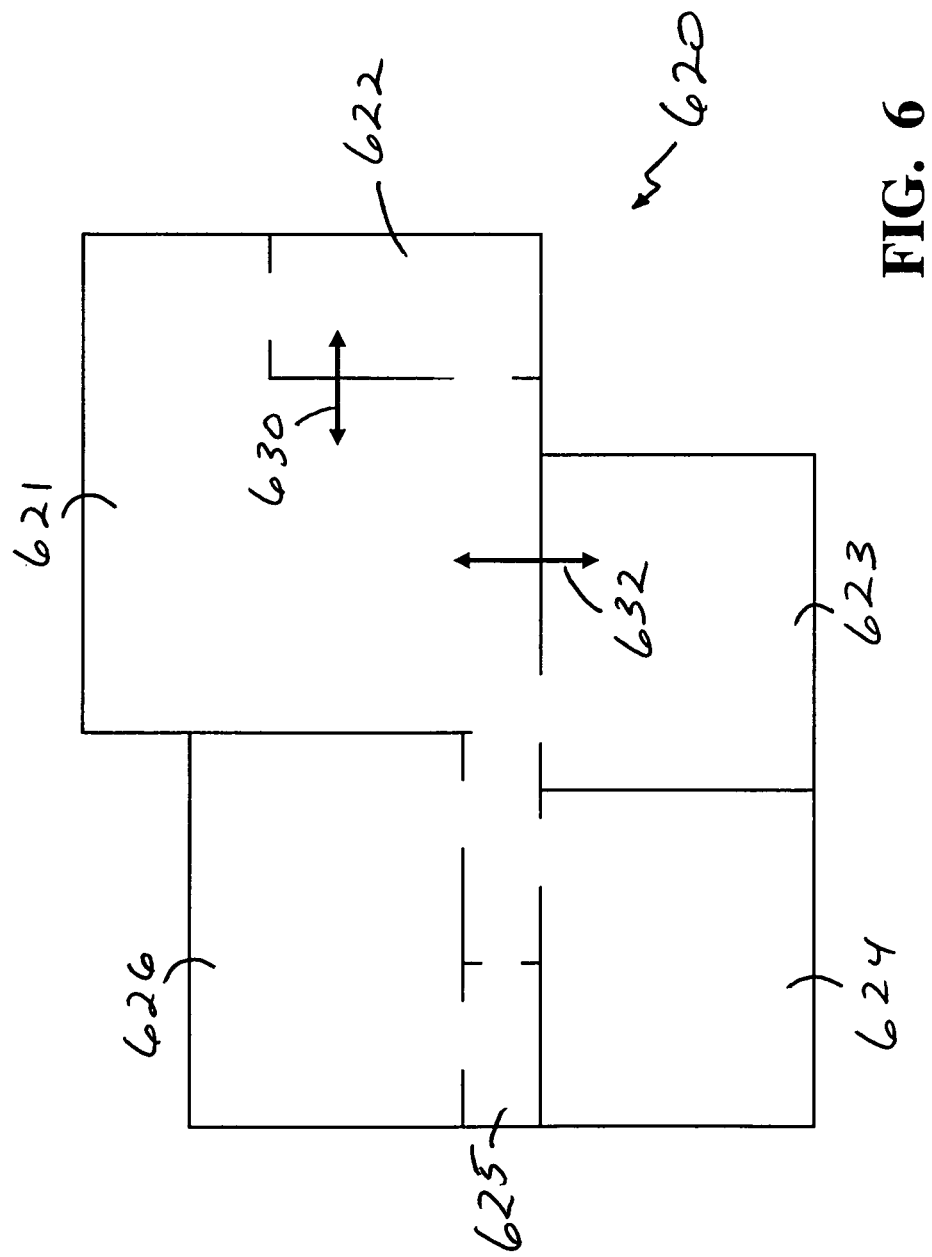
FIG. 6 depicts a simplified block diagram of a style generated floor plan of a house, defining multiple rooms, by using location, compass, inclination, direction of travel, and other such parameters.

FIG. 6 depicts a simplified block diagram of a style generated floor plan 620 of a house, defining multiple rooms 621-626, by using location, compass, inclination, direction of travel, and other such parameters. In some embodiments, the recording system 120 additionally includes a measurement detector that measures distances to boundaries such as walls and stores the measurements with the media content. Additionally and/or alternatively, precise measurements can be later added to adjust the generated floor plan 620. Similarly, further details of the layout can be later added (e.g., identifying closets, identifying additional storage, adding a narrative, and the like).

Once the layout 620 is defined according to the content, each content (e.g., the content for each room) can be associated with other content within close proximity (e.g., content of neighboring rooms). As such, the playback allows a user to control the playback as a virtual tour. The user during playback selects the direction of travel relative to the layout and the association of the content dictates which content is to be displayed next based on the location parameter data of the current content (e.g., 460 degree video of a first room 621) and the selected direction of travel (compass heading relative to right, left, up, down of the displayed content) within the virtual layout. This is implemented, in some embodiments, by associating a first content (e.g., first room 621) with a second content (e.g., second room 622) relative to a right and left movement 630, respectively. Similarly, the first content (e.g., first room 621) and a third content (e.g., third room 623) can be associated by a relative up and down movement 632, respectively. Other such association can be utilized to provide the virtual tour, and/or other controls (e.g., north and south, or east and west movements).

Other styles can provide other layouts and/or content organization. As a similar example, some styles may provide a virtual tour or house playback style that starts the user at a root menu that allows the user to choose a specific room. The style could then organize the content to define a sub-menu based on the selection that displays various images of parts of the selected room, and/or a 360 degree panning movie of the room. Another example of a house playback style could provide the user with an adventure-game style view, done all through still shots or panning, allowing the user to access a control interface (e.g., joystick, mouse, keyboard, or other such interface) to steer or turn left and right or move forward or backward through the space from one room to another.

Additional styles and/or templates can be configured to generate a map based on location data of content or a map can be retrieved (e.g., over the Internet). The content can be associated with the map and organized according to the map. The map can be displayed and further be selectable, such that a user can select a portion of the map and the content associated with that portion of the map is retrieved. Similarly, the user can move through the map (e.g., using arrow keys or a mouse) and content can be displayed that are associated with the portions of the map toured. The map can be a local map (e.g., map of a house, map of an amusement park), or a more general map, such as the map of a city, a state, a country or the world. Maps can be associated so that, for example, as a user is viewing content associated with a first country and then views content associated with a second country a world map can be displayed highlighting the second country associated with new content, and then a map of the second country can be shown highlighting locations within the second country associated with the content. This detail of mapping can depend on the amount of content associated with different locations. In some implementations, the map can be shown on one side of a display highlighting locations and/or allowing a user to select locations while content is displayed on the other side of the display.

The styles can define the playback to be a continuous playback of the plurality of content. Alternatively and/or additionally, the style can provide a more interactive playback such as a virtual tour and/or web browsing interaction where content to be played back is based on a user's selections (e.g., move a pointer left or right). In some implementations, the style organizes the content according to an expected playback of the content, for example, by creating the playback experience and recording the content files onto a DVD disc according to sequential GPS locations based on an anticipated playback, such as an expected direction of travel for a driving virtual tour. The style can even include timing with the data, such as timing based on anticipated driving rates. The playback can further be overridden by the user to stop if the user is not to a particular location at an anticipated time, and/or to start when the user gets to a location prior to a playback anticipated time. The playing back of such organized content is not limited to the playback based on the anticipated timing, but instead would attempt to determine location of the playback device and control playback based on the actual location. The content, however, recorded with anticipated timing could be used with playback devices that do not have the capabilities to use the location parameter data (e.g., could not determine location or determine playback based on the metadata). In other styles, the content can provide a time line or time laps of the same or similar pictures. As one example, content having the same location parameter data can be organized by time and sequentially played back providing time laps versions of the same or similar pictures, such as organizing Christmas pictures taken at Grandma's house into a time line, or school pictures being organized and related so that the pictures are sequentially accessed and show the time laps.

In some instances, the organization of the content further generates an index or list of the file structure and/or content. The index can be utilized by a user regardless of the order of the content, or the location of the playback device. Further, the user can use the index to initiate playback with playback devices that can not use the parameter data. Additionally, the index can be used by playback devices that provide playback parameter data to search the index and select content for playback. For example, each title or chapter includes associated parameter data, such as associated location, and the content is indexed by the titles and chapters. The indexes and/or lists can be organized in a hierarchy to allow a user to access more focused content. Still further, the index in some implementations can be displayed while the content associated with the index is simultaneously displayed. For example, the index can be displayed on a left side of a display screen while content is displayed on a right side. The user can scroll through the index and the associated content can be displayed.

As indicated above, the styles utilized by the organization system 420 can be obtained from third parties, such as an amusement park, a national park, and other sources. The present embodiments can additionally be employed by companies, organizations or individuals, such as, amusement parks, to generate personalized playback experiences for sale to customers as additional revenue streams. In these implementations, the system can be utilized, for example, the amusement park to generate a playback experience that is personal to a specific customer. The amusement park can capture multimedia footage of a customer as the customer is on one or more rides throughout the park. Rides can include scanners allowing customers to scan a bar code on his/her ticket thus the system knows when the customer is on a ride. Camera's positioned around the ride record images/video of the ride as the customer is on the ride. The content includes parameter data that associates the content with the customer. At the end of the day, the park can offer the customer a playback experience of the customer's day at the park, for example by again reading a bar code on the customer's ticket, and collecting and organizing based on a style the content associated with the customer. Further, the playback experience can be custom to the customer's day, e.g., based on the time line of the customer's day.

Figure 7:
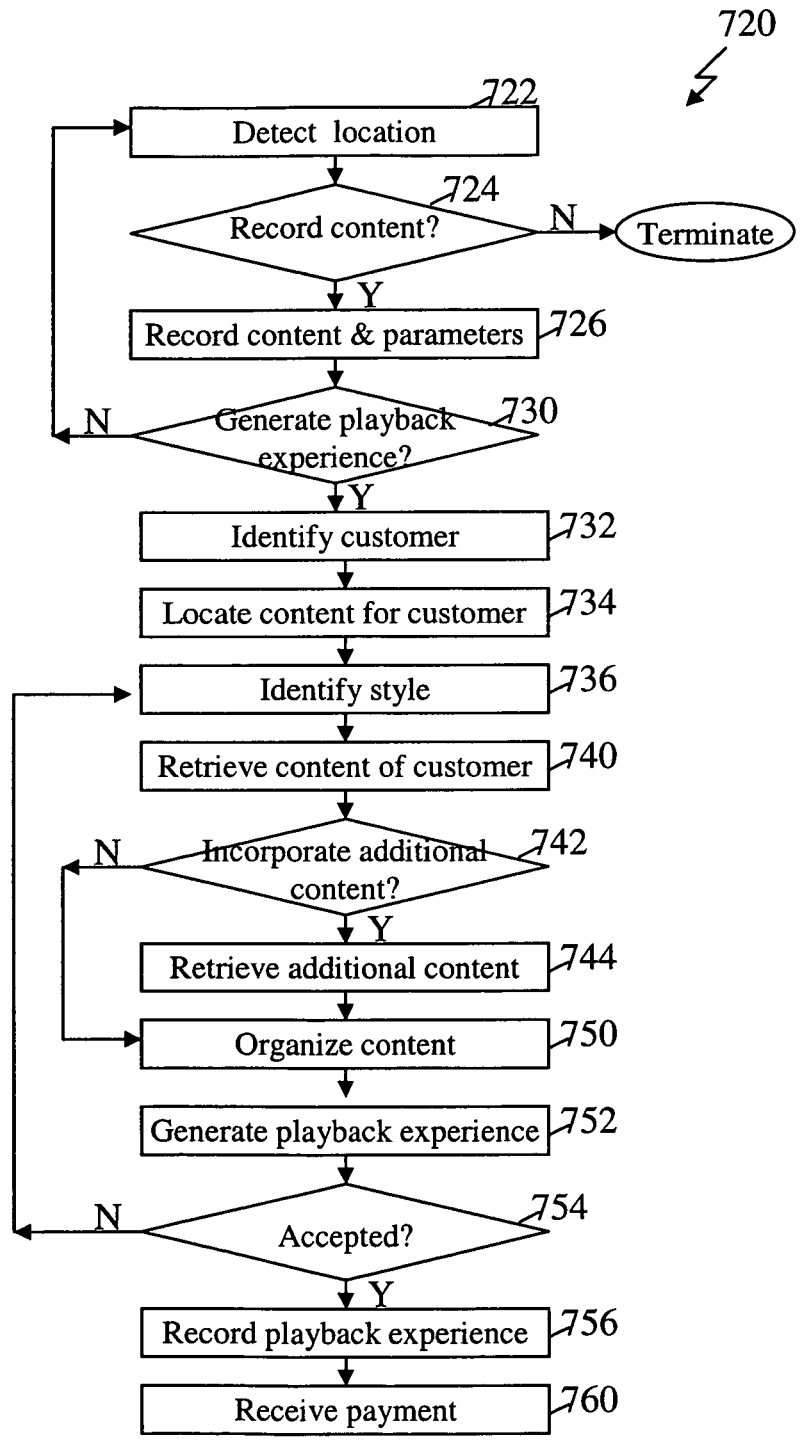
FIG. 7 shows a simplified flow diagram of a process for generating a playback experience for customers.

FIG. 7 shows a simplified flow diagram of a process 720 for generating a playback experience for customers. This process can provide an additional revenue stream for those companies that employ the process. For example, an amusement park can sell increased priced tickets that include a playback experience of the customer's day at the amusement park. Alternatively and/or additionally, the park can offer the playback experience for sale as the customer is leaving the park. Similarly, the amusement park can offer different levels of a playback experience. For example, some customers paying a first rate can be give tracking devices that allows multiple cameras scattered around the park to take large amounts a content footage of the customer. Other customers may instead paying a second, less rate to only receive content footage of the customer while on or at certain limited numbers rides and/or attractions. The amusement park can further employ different types of styles in generating the playback, and the cost can be based on the style (e.g., a simple timeline playback experience can be a lower cost than a more detailed style creating a playback experience with theme music, narrative and added content).

Still referring to FIG. 7, in step 722 a customer's location is detected. The detection of the location can be achieved through any number of methods. For example, a customer can scan his/her ticket prior to getting on a ride (e.g., the customer's ticket includes a unique bar code that is optically detected), a wireless communication tracking device can be supplied to the customer, a customer's wireless phone can be registered and used in tracking, and other such methods can be used. In some instances, the amusement park or other user employing the process 720 can utilized multiple detectors to determine direction of travel, triangulation for more precise location, and other benefits.

In step 724 the process determines whether content should be recorded. In some instances, the detection of the location of the customer initiates recording, while in other instances recording might be delayed or prevented. For example, the customer may not be in an area where recording is desired; there may be a time delay until the customer gets to a predefined position on a ride where recording is initiated (e.g., just before going over a drop in a roller coaster); some customers may not have paid to get footage, but still scanned their ticket; there could be different levels of recordings depending on the amount a customer pays; and other such criteria in determining whether recording should be initiated and/or continued. If content is not to be recorded, the process 720 terminates. Alternatively, when content is to be recorded the process continues to step 726 where the recording of media content and parameter data is initiated and/or continued. The parameter data can include substantially any relevant parameter data including, but not limited to, customer ID (e.g., a ticket number, transmitter ID, cellular phone ID or some other ID), time, date, location, direction of travel, associated content, and other such parameter data.

In step 730, it is determined whether a playback experience is to be generated, such as determining whether a customer is exiting the amusement park and has requested the playback experience. If a playback experience is not to be generated, the process returns to step 722. When a playback experience is to be generated, step 732 is entered where the customer for whom the playback experience is generated is identified (e.g., scan ticket, enter customer ID, use the customer's tracking device, and other such methods). In step 734, a content library is searched and/or parsed, and content is identified that is associated with customer. The content library can be organized so that a copy of the content associated with the customer is stored in a separate director for each identified customer associated with that content. In some implementations, the content can be stored generally with an index created for the customer ID identifying where content for the customer is located. Using the index potentially reduces the amount of storage as the same content may have to be stored for multiple different customers, as several customers could be included in the same media content footage (e.g., several different customers on a single ride at the same time), and other such storage configurations, schemes and/or combinations can be utilized.

In step 736, a playback experience style is identified when more than one style is available. The amusement park or other user of the process 720 may have several different styles for different customers. The styles can include added footage, information, sound, music, orientation, and other such content along with the content specific to the customer to enhance the playback experience. For example, there may be different styles for kids versus adults. Similarly, there may be different styles for boys versus girls. Additionally, the amusement park may have several different styles (e.g., different themes, musical background, background colors, the way content is presented, and other such features) from which a customer is allowed to select a desired style.

In step 740, the content specific to the identified customer is retrieved. In step 742, the process determines whether additional content is to be incorporated. In some implementations, the amusement park can allow the customer to add additional customer recorded content into the playback experience. For example, when the user has a recording device that records content and parameter data, the recorded content and parameter data can be transferred or downloaded to the amusement parks system and incorporated into the customer's final playback experience. In some instances the amusement park may supply the customer with a recording device (e.g., digital camera and/or digital video recorder). Then the park can use the customer recorded content from the park supplied recording device in addition to the amusement park's recorded content in generating the playback experience. Further, the recording device can also include, in some implementations, a transmitter to transmit to the amusement park system the location of the recording device, and thus, the customer does not necessarily have to scan his/her ticket because the park knows his/her location based on the location of the recording device.

In some implementations, the customer does not necessarily have to purchase the playback experience at the amusement part, but instead can later access a remote server controlled by the amusement park to purchase some or all of the content and/or generated playback experience. Further, the customer can download additional customer generated content to the server so that the server can include the additional customer generated content to the final playback experience. Additionally and/or alternatively, the playback experiences created by the amusement park and supplied to the customer can be configured in some implementations to further be accessible to the customer to allow the customer to take the playback experience and augment it with his/her own content, edit the playback experience, extract content from the playback experience, and/or otherwise use the content.

Still referring to FIG. 7, if additional content is to be added, step 744 is entered where the additional content is retrieved. When additional content is not to be added, the process continues to step 750. In step 750, the amusement park generated content and/or customer generated content is organized according to the selected and/or predefined style. In step 752, the playback experience is generated. In step 754, it is determined whether the playback experience is accepted. For example, in some implementations as an optional feature, the customer may be allowed to view the playback experience to see if the customer likes the style. If it is determined in step 754 that the playback experience is not accepted, the process returns to step 736 to generate a new playback experience, for example using a different style. When the playback experience is accepted, step 756 is entered where playback experience is recorded and/or delivered to the customer (e.g., the playback experience may be emailed to the customer's email address, posted on web site where the customer can access and retrieve, or other such methods of recording and delivering. In step 760, payment for the playback experience is received if payment has not already been received (e.g., the customer may pay for the playback experience when purchasing a ticket to enter the amusement park). In an alternative implementation, the process 720 can organize the amusement park content as the content is recorded. For example, the amusement park can use a predefined style, determining a location of the customer, and storing the recorded content according to the predefined style as the content is recorded.

The content generated and associated with a customer can also include additional parameter data to associate the content with specific attractions, highlights and/or other such features of the amusement park. For example, characters that roam an amusement park such as the Disney characters (e.g., Mickey Mouse, Minnie Mouse, Donald Duck and other characters) can include tracking devices such that content recorded by the park for customers can further be associated with the character(s) or other attraction. When content is being recorded that is proximate the characters, the recorded content can not only be associated with the location within the park, but also with the character. When the content is organized, the content can further be organized based on the characters and/or other attractions.

The process 720 is only one example for use in providing a playback experience to customers as an additional revenue stream. In some implementations, the process 720 can be a simplified version, such as a version that terminates after step 734 following an additional step of storing the content in a basic organization style and supplying the basically organized content to the user.

This simplified or basic style allows a user to take the content home and organize it themselves or to apply additional, private information or a highly-customized style that is outside the purview of that available to the recording entity. The basic organization can be any number of different types of organizations, such as a type of simple, list-based style manifested at a level that may not include DVD-style navigation but simply hierarchical file-organization on the recording medium. For example, an amusement park could include subfolders organized by location and/or time and named appropriately. These basic styles would simply provide the user with the content, while still making use of the embedded parameter data from within the sources. Further, these simple style playback experiences could additionally include some or all of the parameter data to aid the user in organizing the content as desired and/or automate the organization of content such as defined according to the present embodiments.

Further, the process 720 is described above with reference to an amusement park. The implementation of the process 720, however, is not limited to an amusement park and instead can be used at substantially any venue, event, location, facility, function and the like. For example, the process 720 can be used at sporting events and tournaments (e.g., golf tournaments, basketball games, football games, auto racing, and the like), concerts and other entertainment events, museums and monuments, national parks, and other such events and locations. Similarly, the process 720 can be used by professionals and/or individuals for personal events such as weddings, by positioning multiple cameras and/or video cameras around the wedding and/or reception and using tracking devices on important individuals (e.g., bride, groom, fathers, mothers, bridesmaids, groomsmen, and other). Further, the tracking devices can further measure biometric parameter data of the individuals for further organizing and prioritizing content in the creation of one or more the playback experiences. Still further, the process 520 can be utilized to provide individualized playback experiences for the tracked individuals (e.g., one playback experience for the bride and groom, a different playback experience for the bride's parents, and yet still a different playback experience for the groom's parents).

The present embodiments further provide for the playback of content based at least in part on the contents' parameter data. For example, in some embodiments, the playback of content is determined based on a location of the device playing back the content. Other parameter data can additionally and/or alternatively be used in determining which if any content to playback. The playback can be based on where the user is, what time it is, who the use is, where the user has previous been and/or what the user has previously done. Based on the parameter data, the most relevant content is selected to be playback. The playback of content can additionally and/or alternatively be limited based on biometric parameter data. For example, the content may have been generated with a large amount of content but the user can restrict the playback to those scenes having a minimum biometric level. This way, all of the content is available and the user does not have to delete content, but the playback is limited to more relevant or important portions.

Figure 8:
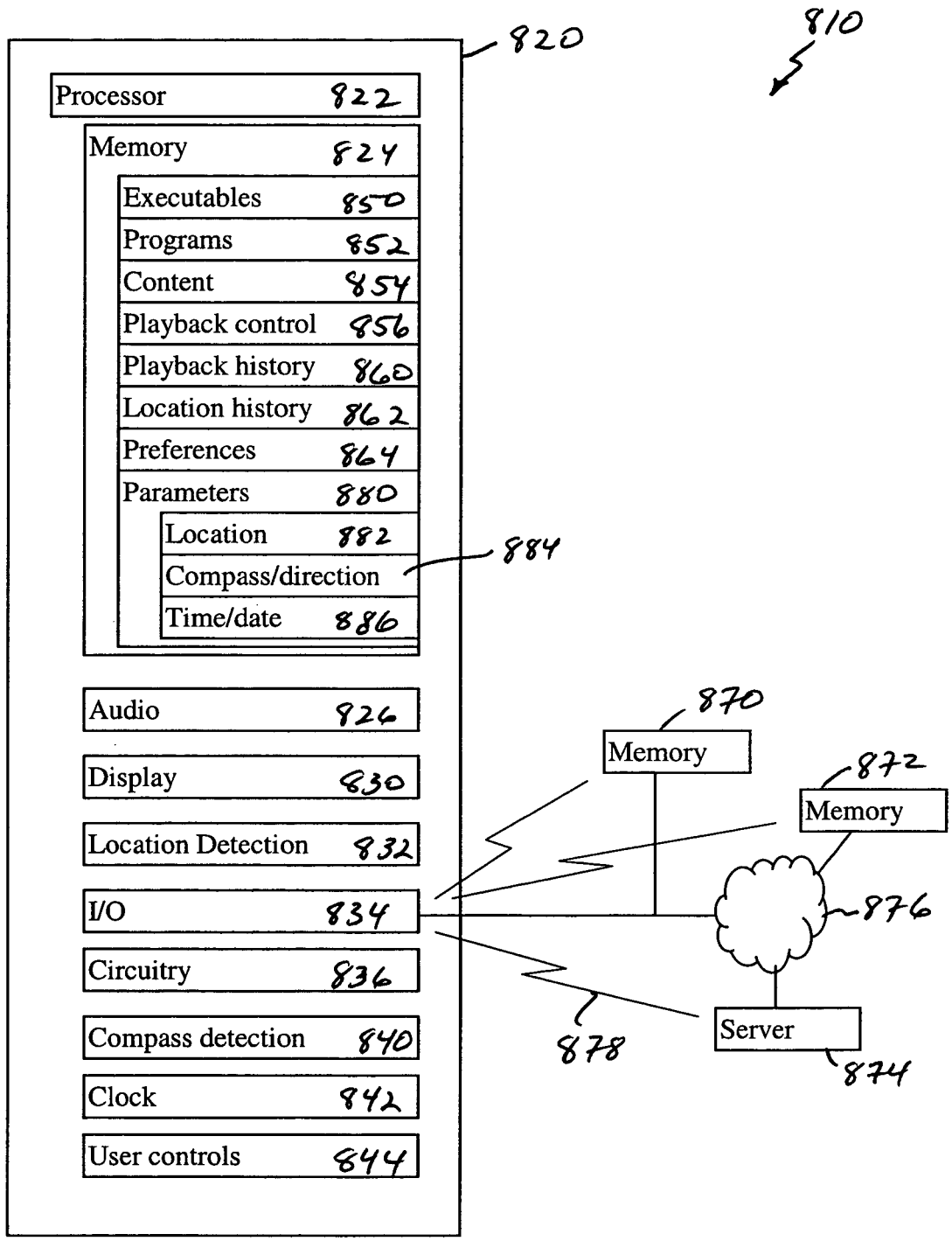
FIG. 8 depicts a simplified block diagram of a media content playback system according to some embodiments.

FIG. 8 depicts a simplified block diagram of a media content playback system 810 according to some embodiments. The system includes a playback device 820 that includes controller or processor 822, memory 824, audio output 826 (e.g., speakers, audio jack, and the like), video output display 830, location detection device 832, input and output ports 834 providing wired and/or wireless communication, and other circuitry 836 for playing back content. In some embodiments, the playback device 820 further includes a compass heading detection device 840, a clock 842, user controls 844, and other relevant circuitry for accessing and playing back media content. The memory contains executables 850, programs 852, media content 854, style playback control conditions 856, playback history 860, location history 862, playback preferences 864, playback parameter data 880 (e.g., location data 882, orientation or compass heading 884, time of day and/or time of year 886, and the like), and other information and/or data. The playback device 820 can communicate with external memory 870, a remote memory 872 and/or remote computers or servers 874. The communication with the external memory, remote memory and/or computers can be by wired (e.g., over a network 876) or wireless communication 878. In some embodiments, the playback device 820 can further include a recording device, such as recording device 120.

In some embodiments, the content to be played back is controlled and/or initiated based on the location of the playback device 820. Through the location detection device, which is either directly incorporated into the playback device or external to and cooperated with the playback device, a location of the playback device is determined. Similar to the recording system 120 of FIG. 1, the location detection device 832 of the playback device 820 can be implemented through a GPS device or other relevant location detection device providing sufficiently precise location data with respect to the location parameter data of the content.

Using the location of the playback device and the media content with parameter data, the processor 822 utilizes the playback controls 856 to determine which, if any, content is to be played back, navigates to and retrieves the content, and plays back the content related to and appropriate for the location of the playback device. Some embodiments are further configured to use more than just location data. Other parameter data can be used to further distinguish between content and determine relevance of the content, such as compass data; time data; user preferences; playback history; location history (there may be additional content for a given location); and other parameters. The playback device can be substantially any relevant playback device configured to playback content according to the analyzed playback parameter data and the content parameter data. For example, the playback device can be a location-aware DVD player to playback DVDs, such as a DVD containing a visual tour of a national park (e.g., Yosemite Valley). As a user drives around the Valley, the playback device 820 identifies audio/video content appropriate to where the user (and the playback device) is located. As the user approaches a certain attraction (e.g., Yosemite Falls) the playback device can identify and select to play a video describing the falls and where to find the best viewpoints. Additionally and/or alternatively, as the user approaches an intersection with another road, the playback device can identify and select to playback a video showing what the user would see if the user turned at this intersection.

The content can be local or remote (remote content can be updated dynamically), and potentially cooperated with media content organization, for example, to provide driving conditions with the content, and alternate driving directions, and other parameters. In some instances, more than one piece of media content may be applicable to a given location. The playback device and/or user may select to play all items sequentially, play only the most relevant item, play only specifically selected items or other playback schemes. The relevance of content can be determined based on playback parameters and/or rules (e.g., limited dates and times), the previous locations visited 862, previous content viewed 860, user preferences 864, and other relevance factors. As introduced above, the playback device can keep records of which media content has been played before, when it was played, how often it was played, the types of media selected by a user, the types of locations visited, and other user preferences. This information is used to determine the relevancy of media content to a user and identify content to be played back.

The playback device utilizes the location detection device 832 such as a GPS-like device to obtain location information (latitude, longitude, altitude), and the compass detection device 840 to determine compass information. The location and compass information, as well as time/date information is used to analyze the content to determine which of the plurality of accessible content would be relevant to a current, given or selected location. The relevance can be defined by a scale, such as varying from "not relevant" to "extremely relevant", using a number scale (e.g., 1-10, with 10 being extremely relevant) or other relevance.

There are prior playback devices that utilize location information for identifying content to be played back. Some of these systems, however, use proximity detection to determine the content to be played back. For example, museum audio tour playback devices playback different audio content based on the museum display that is the closest to the playback device. These systems typically rely on the physical location being somehow tagged so that the playback device knows when it is close to a location of interest. Additionally, these playback systems are typically limited to small (i.e. building-sized) areas and generally cannot scale to larger areas. Some other playback systems deliver audio-only content to a user based solely on absolute position (i.e. GPS) information of the playback device. One such example is an audio driving tour of New Zealand provided by Kruse-ITS Limited of Auckland, New Zealand. This audio driving tour, however, is generally limited to playing back local content based solely on absolute GPS location information.

The playback system of the present embodiment utilizes additional parameter data, such as compass heading, time and date data, a history of previously played content, user preferences, and other such parameter data. The present embodiments utilize the additional parameter data to sort, identify, select and playback audio and/or visual content. For example, the playback system in some implementations selects media content based not only on location 882, but time of day and/or time of year 886, direction of travel 884, whether or not the user has been to the same or another location recently, and other relevant parameters. Further, the present playback device can be configured to utilize media content that is local and/or remote. In some embodiments, the playback devices include wireless communication capabilities to wirelessly access content databases 870 to retrieve additional content. Enabling the system to remotely access content allows access to a database of content that is potentially much larger than local only content and further allows the content to be regularly and easily updated.

Figure 9:
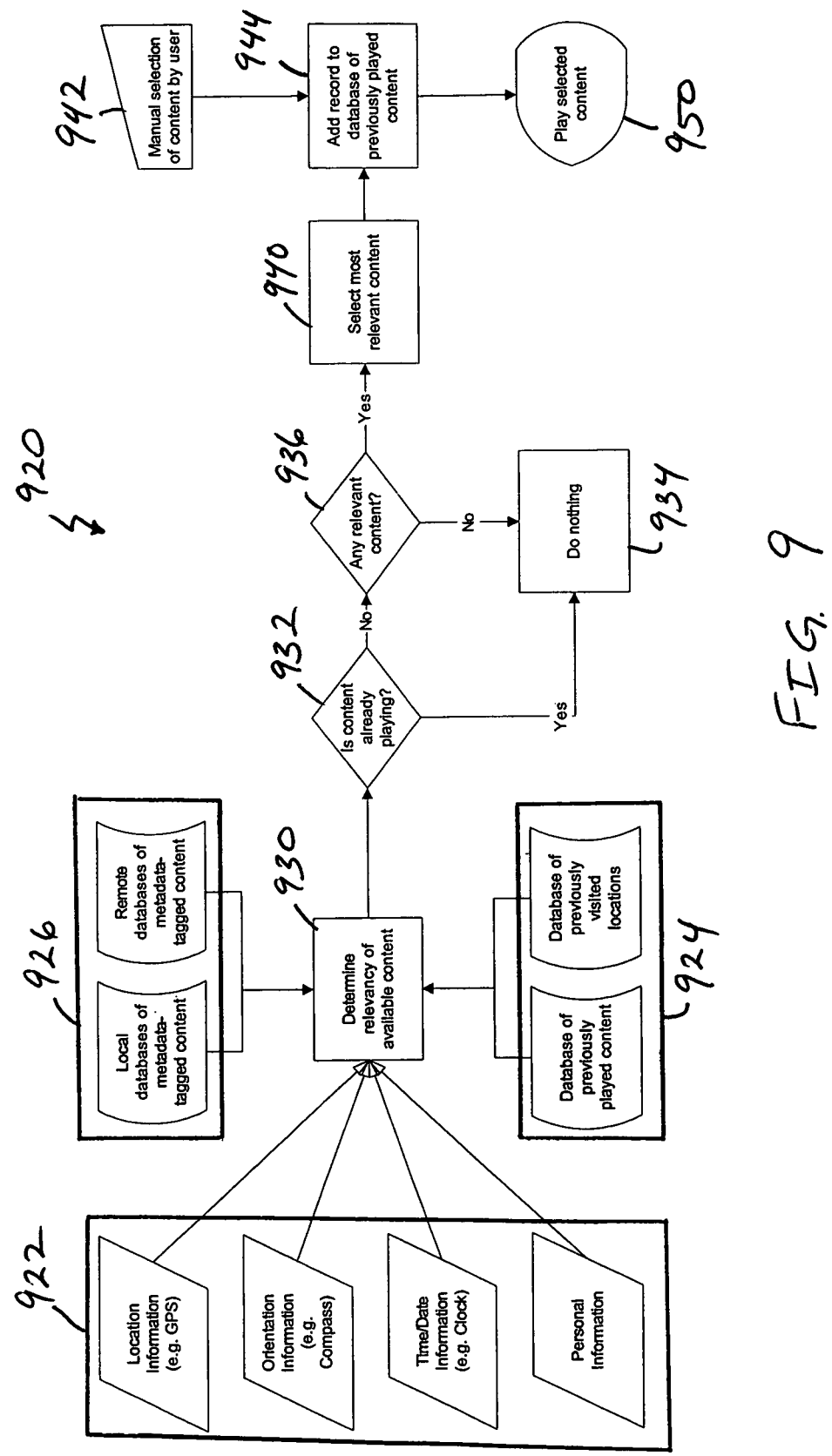
FIG. 9 depicts a flow diagram of a process for use in sorting, selecting, and playing back content based on parameter data.

FIG. 9 depicts a flow diagram of a process 920 for use in sorting, selecting, and playing back content based on parameter data. In step 922, the process retrieves playback parameter data 880, which can be received exclusively from the playback device, or received from a variety of potential sources, including wirelessly received data. The playback device's parameter data can include location information (e.g., GPS data) 882, orientation information (e.g., compass data) 884, time and/or data information (e.g., from clock 842 or location detection device) 886, user information (e.g., personal preferences 864), and other device parameter data. In step 924, the process retrieves playback history 860 and/or location history information 862 when available. Again, this history information and/or parameter data can be stored locally on the playback device (i.e., memory 824), in external memory 870, and/or remote memory 872.

In step 926, media content is accessed, where the content can include local content 854, external content and/or remote content. In step 930, the process parses and/or sorts the available content parameter data to identify one or more content that is relevant to the playback device parameter data obtained in step 922. In step 932 it is determined whether content is currently being played back. When content is being played back, step 934 is entered where the playback device does nothing and/or caches the content identified in step 930. When content is not playing, step 936 is entered where it is determined whether any relevant content was identified in step 930. When relevant content is not identified, step 934 is entered, the process 920 does nothing, and terminates.

When relevant content is identified in step 936, the process continues to step 940 where the content is sorted identifying the most relevant to the least relevant. For example, the process can utilize location history data to determine that a user has previously been to several national parks, and thus prioritize content related to another nearby park as more relevant than content related to a nearby museum. In step 942 the process determines if a user has entered a manual selection of content, whether the selection is from the content identified in step 930 or other content. In some implementations, the system allows the user to override the system to access substantially any information regardless of the relevance to the playback device's parameter data. In some implementations, however, the content may be limited based on a user's subscription to access only limited available content as described fully below. In step 944, based on the sorted relevance of the content and/or the user selections, the process adds the content to be played back to the playback history 860. In step 950, the content is made available and played back to the user.

The playback system 920 has been described as a single device containing the location device, the hardware and/or software for implementing a search of content (e.g., processor 822), and other relevant components. In some embodiments, a remote device, such as the remote server 874 additionally and/or alternatively includes some or all of these components and/or processing capabilities. For example, the playback device might include the location detection device 832 and forwards location information to the remote server 874. The remote server then utilizes the location information to initiate the search of content from a remote memory 872 and forwards one or more identified content to the playback device for playback.

The process 920 can be utilized with substantially any type of content with associated parameter data. In some implementations, the playback process 920 provides substantially real time playback of current conditions, such as road conditions. The media content can be a plurality of data feeds and/or real time streams (e.g., video and/or images of roadways within and/or around a metropolitan area) along with parameter data including location where content is retrieved, time content was retrieved, and direction of orientation (e.g., northbound lanes versus south bound lanes), is supplied to a remote storage 872. In some implementations, additional parameter data can be supplied with the content, such as speed of traffic and other relevant parameter data. Based on time data and location information, the system can generate real time navigation through traffic based on a user defined pathway.

For example, referring back to FIG. 9, in step 922, a driver's location, orientation or direction of travel, time of day, and in some instance desired destination and/or preferred route of travel (e.g., based on past history), are provided from a playback device within an automobile to a remote server 874. The remote server is further coupled with the library of current and/or real time video and/or images of roadways within and/or around a metropolitan area. In step 926, the remote server accesses the library of roadway video/images. In step 930, the server identifies those roadway images/videos that are relevant to the automobiles current location and expected route of travel based on the parameter data associated with the real time content and supplies the content to the playback device to allow a user to determine an optimal driving route.

In determining the images/videos to supply, the server can forward the traffic data for the road/freeway that the automobile is currently traveling on, as well as potential alternative routes based on the direction of travel, an assumed route, and/or a preferred route. Additionally and/or alternatively, the style utilized in organizing the content, such as through the process 520, can include evaluations of the traffic (verbal, graphical and/or textual), for example, when parameter data includes speed of traffic that is forwarded with the real time video/image content to the library 872. Similarly, the style can further provide verbal, graphical and/or textual recommended driving directions again based on an evaluation of the parameter data (e.g., speed of traffic) for routes to the desired destination.

Similarly, the content to be played back is not limited to multimedia content. Alternatively, some embodiments can supply links, such as Internet links to Internet sites, to access a playback experience and/or multimedia content as part of a playback experience. For example, instead of supplying images/videos of traffic, the server 874 can supply one or more links for one or more cameras mounted along side roadways and/or freeways to the playback device (e.g., a computer and/or a playback device in an automobile) allowing the playback device to access the links and thus the video, image and/or other content provided by the Internet site.

Figure 10:
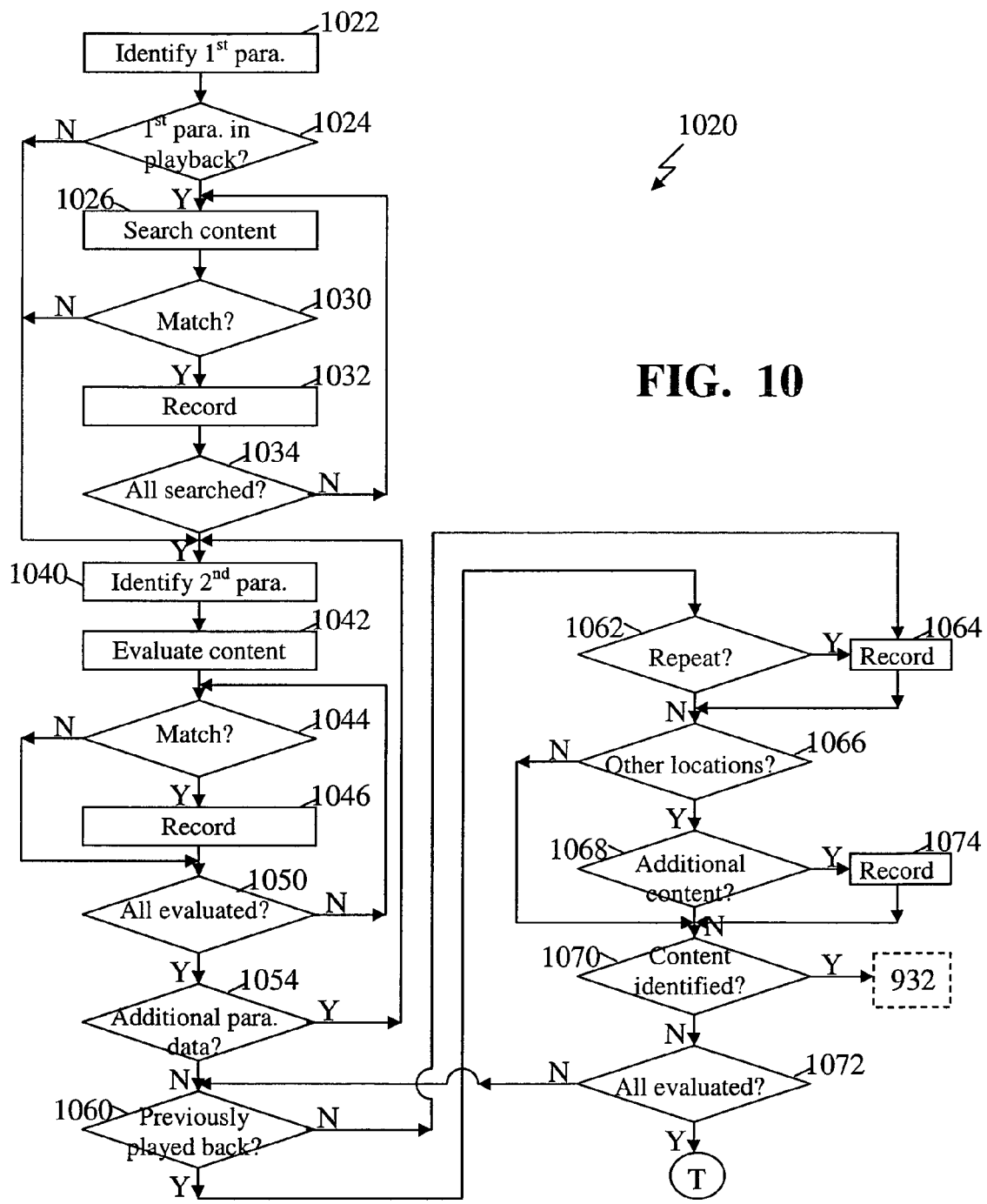
FIG. 10 depicts a simplified flow diagram of a process for determining relevance of content, for example as used in the process of FIG. 9.

In determining relevance, the playback device utilizes the playback device's parameter data to search available content parameter data. FIG. 10 depicts a simplified flow diagram of a process 1020 for determining relevance of content. In some embodiments, the process 1020 is used to perform the step 930 of FIG. 9. In step 1022, the process identifies a first priority parameter data, for example the location data, or a default priority. In step 1024, the process determines whether the playback device's parameter data includes the first priority parameter data (e.g., location data). When first priority parameter data is not available, the process continues to step 1040. Alternative when first priority parameter data is available, step 1026 is entered where local, external and/or remote content is searched. In some embodiments, an index of the content as described above is utilized to search the content. In step 1030, the process determines whether one or more matches were found. When a match is not found the process continues to step 1040. When a match is found the one or more content identifiers are recorded in step 1032. In step 1034, it is determine whether all of the content has been searched. When all of the content has not been search the process returns to step 1026.

When all of the content has been search, the process continues to step 1040 where a second highest priority parameter data is identified (e.g., compass heading or direction of travel) if a second priority has been defined, or a default priority may be utilized. In step 1042, the parameter data of the content identified through searching based on the first priority parameter are further evaluated based on the second priority. For example, the second priority parameter may be a compass heading that is matched with content compass parameter data; a current date (e.g., June 17) that can be matched with parameter data that includes a date range (e.g., May 1- September 30); or other such parameters. In step 1044, the process 1020 determines whether there is a match of content parameter data with the playback device's parameter data. When a match is not detected the process continues to step 1050. When a match is detected, step 1046 is entered where the content identifier is again recorded. In step 1050, it is determined whether all of the previously identified content has been evaluated. When all of the content has not been evaluated, the process returns to step 1044. In step 1054, it is determined whether additional playback parameter data is to be further compared or evaluated. When additional parameter data is to be compared, steps 1040 through 1050 are optionally repeated for any number of parameter data.

In step 1060, the process 1020 accesses the playback history to determine whether any of the identified and recorded content has previously been played back. When none of the identified content has been previously played back, the process continues to step 1064. If one or more of the identified content have been previously played back, step 1062 is entered where the process determines whether the content should be repeated and records the identifier of those to be repeated in step 1064. In some implementations, the content parameter data can include an additional repeat parameter that specifics whether to repeat, a time period that should expire before repeating, how many times to repeat, and other similar information. For example with advertising content, the repeat parameter might be set to repeat each time, while content about a portion of a national park would be repeated only after a predefined number of days (e.g., 10 days to avoid repeats during the same vacation) since the previous playback.

In step 1066, the process accesses the location history 862 to determine whether other related locations have previously been visited and/or whether the playback device has already been at the current location. When the playback device has not previously visited the location, the process continues to 1070. When the playback device has previously visited associated locations, step 1068 is entered where the process 1020 determines whether additional content associated with the previous location should additionally be played back, whether to avoid playing back the content because similar content has already been played back, or whether other such conditions are meet. When additional content is not to be playback the process continues to step 1070. Alternatively, when the additional content is to be played back, step 1074 is entered where the additional content identifier is recorded.

In step 1070, the process determines whether content to be played back is identified. When valid content has not been identified the process terminates. Alternatively, when valid content to be played back has been identified, the process continues to playback the content, such as continues to step 932 of the process 920 of FIG. 9. Alternatively, when valid content is not identified, step 1072 is entered to determine whether all identified relevant content has been evaluated and displayed. When identified relevant content has not been evaluated, the process returns to step 1060. When all of the relevant content has been evaluated, the process terminates.

In steps 1034 and 1044 the process 1020 attempts to identify a match. A match was implied above as a yes or no decision. These matches, however, are not restricted to simply be yes or no decisions. The analysis of whether a parameter matches a particular piece of content may result in a range of values. For example, comparing the content's location parameter to the device's location parameter may result in a numerical value (e.g., 0.0 to 10.0) indicating relative proximity. As a result, several pieces of content may be identified as "matches", but some content is a stronger match than other content.

In some embodiments, the playback system 810 in cooperation with the media content that includes parameter data automatically selects, navigates to, and plays back identified media content related to and appropriate for the location of the playback device. This playback can be utilized for numerous applications. For example, the playback can be used with walking or driving tours. Because the playback device is aware of its location, tours can be non-linear and adapt to whatever route the user chooses to take. As another example, the playback content can provide highly relevant travel information. A traveler in some implementations could use a playback device that has wireless communication capabilities along with the location detection capabilities (e.g., GPS-enabled cell phone). By wirelessly communicating with remote servers 874, the location information can be forwarded to the server where the server uses the location information to retrieve relevant content from a database and return the content to the user, such as to view videos of points of interest, hotels and/or restaurants near their current location.

The playback system can further be utilized in some implementations for location-specific advertising. For example, a traveler might receive, based on location information from the playback device, location-specific advertisements for nearby restaurants, from local or remote memory. In some instances, the server determines which restaurants are advertised based, for example on the time of day, known personal preferences, or other such content and/or user parameters.

The playback device is configured to determine a current location. GPS positioning technology can be use for ascertaining the position information; however, other such positioning systems that allow the playback device to determine its position with appropriate accuracy can be used. As introduced above, compass information (orientation) and time/date information can additionally be determined by the playback device. The compass information allows the device to factor in orientation when deciding which content is most relevant. For example, the playback device can select content describing a view of either Yosemite Falls or Half Dome, depending on the direction the user is facing. Time and date information allows the device to deliver time-sensitive information as well. For example, the restaurant advertisement to a playback device (e.g., cell phone) can be for breakfast at 9:00 am, lunch advertising at noon, and dinner advertising at 7:00 pm.

The present embodiments provide for the capabilities to generate multimedia content that includes parameter data that is used in organizing the content and/or generating a playback experience. Further, the present embodiments simplify the generation of a playback experience by automating the analysis, organization and cooperation of content based on content parameter data. The generation of the playback experience is reduced to a one or two click user experience, allowing the user to load in the content, and the system processes the content to generate the organized playback experience, which can be easily recorded to memory, such as a DVD. Further, the present embodiments allow a user to easily and quickly view content organized based on a selected style, and then to initiate through a single click a switch to a different style without additional input from the user other than the selection of a different style. The present embodiments simplify the organization of content as well as the generation of a playback experience while reducing or substantially eliminating a need for user input and/or entering of data.

Further, by utilizing the playback parameter data, the present embodiments provide for the dynamic generation of playback experiences in substantially real time. For example with advertising, the playback experience including the advertising is generated based on a current user location and thus generated dynamically. Further, current and pertinent content is identified using playback location parameter data and/or time data. Therefore, the present embodiments allow content to be played back that is particularly relevant to the user at the current time.

By incorporating and/or associating parameter data with content, the present embodiments further allow additional methods for locating content that a user wants to view. For example as introduced above, maps can be generated and/or retrieved that allow a user to select locations on the map and the content associated with or near that selected location on the map is retrieved. Similarly, some styles provide indexing that allow a user to quickly locate content based on the organized index of the content.

Some embodiments further allow a user to utilize common language searching to identify and retrieve content of interest. As introduced above, the parameter data in some implementations further include and/or incorporate search terms. These search terms allow the playback system to quickly identify content that a user may be interested in based on user or system entered search criteria and/or terms. Similarly, common language can be used to search content without common language content. For example, a user can search for "summer" content. The system can define the common language for "summer" as dates extending from, for example, June 1 through August 31, and retrieve all content having date parameter data within this date period. Other similar common language searching can be performed to locate content.

While the invention herein disclosed has been described by means of specific embodiments and applications thereof, numerous modifications and variations could be made thereto by those skilled in the art without departing from the scope of the invention set forth in the claims.

What is claimed is:

1. A method for use in organizing source content, the method comprising:
accessing a plurality of media content files of a subject, at least one of the media content files having parameter data associated with the at least one of the media content files, the plurality of media content files having been recorded over a period of time and associated with the subject when recorded;
identifying the subject at the end of the period of time;
initiating the organization of the accessed plurality of recorded multimedia content:
identifying a first organizational style of a plurality of different organizational styles, where each of the plurality of organizational styles define one or more parameters that when utilized dictate how media content files are to be organized;
identifying a first parameter data item as defined in the first organizational style; observing the first parameter data item, as defined in the first organizational style, within the parameter data associated with the at least one of the media content files;
organizing the at least one of the media content files relative to a remainder of the plurality of media content files as a function of the first parameter data item within the parameter data associated with the at least one of the media content files, thereby organizing the plurality of media content files as a function of the first organizational style; and
generating an output content incorporating the plurality of media content files as organized as a function of the first organizational style.

2. The method of claim 1, wherein the first parameter data item is a location parameter data item, and the organizing comprises organizing the at least one of the media content files relative to a remainder of the plurality of media content files as each media content file relates in location to the remainder of the plurality of media content files.

3. The method of claim 2, wherein the first organizational style comprises a virtual tour organization such that the organizing comprises organizing the at least one of media content files as a function of a proximity of the location parameter item of the at least one of the media content files relative to location parameter items of the remainder of the plurality of media content files.

4. The method of claim 1, further comprising:
identifying a first media content file according to the first parameter data item of the parameter data associated with the first media content file based on the first parameter data of the first organizational style;
identifying a second parameter data item of the first media content file;
identifying a second media content file based on a relevance of a first parameter data item associated with the second media content file to the first parameter data item of the first media content file;
identifying a second parameter data item of the second media content file; and
the organizing comprises incorporating the first and second media content files into the output content according to the first organizational style based on the relationship between both the first parameter data item of the first and second media content files and the second parameter data item of the first and second media content files.

5. The method of claim 1, wherein the accessing the plurality of media content files comprises remotely accessing at least a portion of the plurality of media content files.

6. The method of claim 1, further comprising:
remotely retrieving the first organizational style.

7. The method of claim 1, wherein the first organizational style comprises playback navigational control that is incorporated into the output content.

8. The method of claim 1, further comprising:
prioritizing the plurality of media content files according to at least one biometric parameter data item.

9. The method of claim 1, further comprising:
identifying a second organizational style to the plurality of media content; and
repeating the accessing, the identifying the first parameter data item, the observing, the organizing and the generating the output as a function of the second organizational style.

10. The method of claim 1, further comprising:
identifying a second organizational style that is different than the first organizational style;
identifying a second parameter data item as defined in the second organizational style, where the second parameter data is different than the first parameter data item;
observing the second parameter data item, as defined in the second organizational style, within the parameter data associated with a plurality of the media content files;
organizing the plurality of media content files relative to a remainder of the plurality of media content files as a function of the second parameter data item within the parameter data associated with the plurality of media content files, thereby organizing the plurality of media content files as a function of the second organizational style; and
generating a subsequent output content incorporating the plurality of media content files as organized as a function of the second organizational style.

11. The method of claim 1, further comprising:
identifying a second organizational style that is different than the first organizational style;
identifying a second parameter data item as defined in the second organizational style, where the second parameter data is different than the first parameter data item;
observing the second parameter data item, as defined in the second organizational style, within the parameter data associated with the one or more of the media content files previously organized as the function of the first organizational style;
organizing further at least a subset of the one or more of the media content files relative to a remainder of one or more of media content files organized as the function of the first organizational style as a function of the second parameter data item within the parameter data associated with the one or more of the media content files, thereby further organizing the subset of the one or more media content files as a function of the second organizational style; and
generating a subsequent output content incorporating the one or more of the media content files as organized as a function of both the first organizational style and the second organizational style.

12. A method for use in generating organized playback content, comprising:
identifying a playback style;
retrieving a first style global positioning location parameter item as defined in the playback style;
determining whether a first content global positioning location parameter item of a first multimedia content is global positioning geographically related to the first style global positioning location parameter item as a function of the playback style; and
incorporating, as a function of the playback style when the first content global positioning location parameter item of a first multimedia content is global positioning geographically related to the first style global positioning location parameter, the first multimedia content into a multimedia output as a function of the playback style.

13. The method of claim 12, wherein the determining whether the first content global positioning location parameter item of the first multimedia content is global positioning geographically related to the first style global positioning location parameter item comprises determining whether the first content global positioning location parameter is within a threshold distance of the first style global positioning location parameter, and implementing the incorporating when the first content global positioning location parameter is within the threshold distance of the first style global positioning location parameter.

14. The method of claim 12, further comprising:
retrieving a second style global positioning location parameter item from the playback style;
determining whether a global positioning location parameter item of a second multimedia content is global positioning geographically related to the second style global positioning location parameter item as a function the playback style; and
incorporating, when the global positioning location parameter item of a second multimedia content is global positioning geographically related to the second style global positioning location parameter item, the second multimedia content into the multimedia output according to the playback style.

15. The method of claim 12, further comprising:
extracting a plurality of dimension parameters from a plurality of multimedia content; and
defining a geographic layout according to the dimension parameters.

16. A method for use in playing back multimedia content, comprising:
identifying a current geographic location parameter;
identifying a current compass parameter;
accessing a plurality of multimedia content having location parameter data;
identifying a threshold distance;
identifying a first multimedia content having a first location parameter and an orientation parameter; and
playing back the first multimedia content when the current location parameter is geographically within the threshold distance of the first location parameter, and the current compass parameter matches the orientation parameter.

17. The method of claim 16, wherein the accessing the plurality of multimedia content comprises remotely accessing the plurality of multimedia content.

18. The method of claim 16, further comprising:
determining a current date;
extracting a first multimedia content date parameter;
playing back the first multimedia content when the current data is within a date threshold of the first multimedia content date parameter.

19. The method of claim 16, further comprising:
identifying a second multimedia content having a second geographic location data that is geographically related to the current geographic location;
determining that the second multimedia content has previously been playback; and
preventing a repeat playback of the second multimedia content.

20. A method for supplying a playback experience, comprising:
detecting a plurality of global positioning locations of a subject over a period of time;

generating a plurality of global positioning location parameters relative to each of the identified plurality of global positioning locations;
recording a plurality of multimedia content of the subject corresponding to each of the identified plurality of global positioning locations;
associating each of the plurality of recorded multimedia content with the subject when recording the multimedia content;
recording one of the plurality of global positioning location parameters with each of the plurality of multimedia content;
identifying the subject at the end of the period of time;
retrieving each of the plurality of recorded multimedia content corresponding to the subject and initiating the organizing of the plurality of recorded multimedia content;
organizing the plurality of recorded multimedia content based on the global positioning location parameters associated with each of the recorded multimedia content; and
generating a playback experience of the organized plurality of recorded multimedia content.

21. The method of claim 20, further comprising:
identifying a first playback style; and
the organizing comprises organizing according to the identified first playback style.

22. The method of claim 21, further comprising:
identifying a second playback style; and
reorganizing the plurality of recorded multimedia content based on the global positioning location parameters associated with each of the recorded multimedia content according to the second playback style.

23. The method of claim 20, further comprising:
determining whether additional subject generated content is to be incorporated into the playback experience;
retrieving a plurality of the subject generated content and global positioning location parameters for each of the plurality of the subject generated content;
the organizing the plurality of recorded multimedia content comprises organizing the plurality of recorded multimedia content and the plurality of the subject generated content based on the global positioning location parameters associated with each of the recorded multimedia content and the plurality of the subject generated content; and
the generating the playback experience comprises generating the playback experience of the organized plurality of the recorded multimedia content and the subject generated content.

24. An apparatus for use in playing back multimedia content, the apparatus comprising:
a data storage that stores multimedia content having content location parameter data;
a geographic global positioning location detector that detects a current global positioning location and generates a playback global positioning location parameter data corresponding to the detected current global positioning location;
a multimedia output; and
a processor coupled with data storage and the location detector to receive the playback global positioning location parameter and search the content global positioning location parameter data of the multimedia content for a match between the playback global positioning location parameter data and the content parameter data, and to supply multimedia content identified based on the match to the output to be played back.

25. The apparatus of claim 24, further comprising:
a compass heading detection device that generates a compass parameter data, where the compass heading detection device couples with the processor to supply the compass parameter data such that the processor identifies the multimedia content having an orientation parameter that matches the compass parameter data.

26. The apparatus of claim 25, wherein the data storage is remote from the location detection device and the output.

27. The apparatus of claim 26, further comprising:
a wireless communication device that wirelessly receives the multimedia content supplied to the output.

* * * * *